US011558233B2

(12) United States Patent
Wang et al.

(10) Patent No.: US 11,558,233 B2
(45) Date of Patent: Jan. 17, 2023

(54) WLAN BASEBAND CHIP AND FDMA PPDU GENERATION METHOD

(71) Applicant: Huawei Technologies Co., Ltd., Shenzhen (CN)

(72) Inventors: Shengsen Wang, Wuhan (CN); Li Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 17/142,015

(22) Filed: Jan. 5, 2021

(65) Prior Publication Data

US 2021/0211344 A1 Jul. 8, 2021

(30) Foreign Application Priority Data

Jan. 6, 2020 (CN) ......................... 202010011635.7

(51) Int. Cl.
*H04L 27/26* (2006.01)
*H04L 27/04* (2006.01)
*H04W 84/12* (2009.01)

(52) U.S. Cl.
CPC .......... *H04L 27/2628* (2013.01); *H04L 27/04* (2013.01); *H04L 27/2607* (2013.01); *H04L 27/2692* (2013.01); *H04W 84/12* (2013.01)

(58) Field of Classification Search
CPC ................ H04L 27/04; H04L 27/2602; H04L 27/2607; H04L 27/261; H04L 27/2628; H04L 27/2692; H04W 84/12
See application file for complete search history.

(56) References Cited

U.S. PATENT DOCUMENTS

2018/0019902 A1 1/2018 Hoon et al.
2019/0116555 A1 4/2019 Kris et al.
(Continued)

FOREIGN PATENT DOCUMENTS

| TW | 201941640 A | 10/2019 |
| WO | 2016154951 A1 | 10/2016 |
| WO | 2018155835 A1 | 8/2018 |

OTHER PUBLICATIONS

Bankov, D. et al., "IEEE 802.11 ba—Extremely Low Power Wi-Fi for Massive Internet of Things—Challenges, Open Issues, Performance Evaluation", arXiv:1909.00594v1 [cs.NI], IEEE, Sep. 2, 2019, 5 pages.

(Continued)

*Primary Examiner* — Derrick V Rose
(74) *Attorney, Agent, or Firm* — Slater Matsil, LLP

(57) ABSTRACT

A WLAN baseband chip and an FDMA PPDU generation method are disclosed. The WLAN baseband chip obtains a subcarrier coefficient corresponding to a subcarrier set, m LDR SYNC sequences, and n–m HDR SYNC sequences. The WLAN baseband chip performs duplicating processing on m data streams in n data streams, to obtain m data sequences on which the duplicating processing has been performed and n–m remaining data streams. The WLAN baseband chip obtains m pieces of to-be-modulated data based on the m LDR SYNC sequences and the m data sequences on which the duplicating processing has been performed, and obtains n–m pieces of to-be-modulated data based on the n–m HDR SYNC sequences and the n–m remaining data streams, to obtain n pieces of to-be-modulated data. The WLAN baseband chip performs postprocessing to obtain a frequency-domain symbol sequence, to obtain an FDMA PPDU.

20 Claims, 9 Drawing Sheets

(56) References Cited

U.S. PATENT DOCUMENTS

2019/0306797 A1   10/2019   Azizi et al.
2020/0137686 A1*   4/2020   Cao ................... H04W 52/0235
2021/0258877 A1*   8/2021   Chitrakar .......... H04W 52/0216

OTHER PUBLICATIONS

Lopez, M. et al., "Transmitter Techniques for Multi-Carrier On-Off Keying", 2019 IEEE, May 20, 2019, 6 pages.

Lim, D. et al, "Efficient FDMA transmission for WUR", IEEE 802.11-18/762r0, May 7, 2018, 14 pages, Seoul, Korea.

Suh, J. et al., "FDMA WUR Generation", doc.: IEEE 802.11-18/0784r0, May 8, 2018, 14 pages.

IEEE P802.11 ba/D3.0; Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Wake-Up Radio Operation, LAN/MAN Standards Committee of the IEEE Computer Society, 182 pages.

\* cited by examiner

WLAN BASEBAND CHIP AND FDMA PPDU GENERATION METHOD

CROSS-REFERENCE TO RELATED APPLICATIONS

This application claims priority to Chinese Patent Application No. 202010011635.7, filed on Jan. 6, 2020, which is hereby incorporated by reference in its entirety.

TECHNICAL FIELD

This application relates to the field of wireless communications, and in particular, to a WLAN baseband chip and an FDMA PPDU generation method.

BACKGROUND

Institute of electrical and electronics engineers (IEEE) 802.11 is a series of wireless local area network (WLAN) communications standards. The IEEE 802.11 supports two types of physical layer frames. The two types of frames include a frequency division multiple access (FDMA) physical layer convergence procedure protocol data unit (PPDU). The FDMA PPDU includes a plurality of sub PPDUs, and each sub PPDU corresponds to one WLAN device. A network device may send an FDMA PPDU, to communicate, through FDMA, with a plurality of WLAN devices having a wake-up radio (WUR) receiver. The FDMA essentially is multiple access connection implemented by using a frequency division method, to divide a total bandwidth of a transmission channel into several orthogonal sub-channels. Each WLAN device occupies one sub-channel, and one sub-channel corresponds to one sub PPDU. WUR is a WLAN energy-efficient mechanism defined in IEEE 802.11ba. A new physical layer format is introduced into the WUR. A WUR frame has a high data rate (HDR) mode or a low data rate (LDR) mode.

A current method for generating, by a network device, a WUR frame in a form of an FDMA PPDU includes: The network device stores an On-WG time-domain symbol whose length is two microseconds (µs) (a 2 µs On-WG time-domain symbol) and an On-WG time-domain symbol whose length is 4 µs (a 4 µs On-WG time-domain symbol) that correspond to different communicable WLAN devices. The network device first determines, based on an HDR mode or an LDR mode configured for a sub PPDU corresponding to a WLAN device, to use a 2 µs On-WG time-domain symbol or a 4 µs On-WG time-domain symbol in a time-domain symbol corresponding to the WLAN device to perform on off keying (OOK) modulation processing, to obtain a modulated symbol corresponding to each WLAN device. Then, the WLAN device obtains an FDMA PPDU based on the modulated symbol. In other words, currently, the network device performs OOK modulation processing for each WLAN device based on a time-domain symbol, and then obtains an FDMA PPDU based on a modulated symbol. A current process of generating, by the network device, an FDMA PPDU is: performing processing separately for different WLAN devices in time domain, namely, "distinguishing between" a plurality of users in time domain.

However, a common WLAN chip performs processing for different WLAN devices in frequency domain, namely, "distinguishes between" a plurality of users in frequency domain.

SUMMARY

This application provides a WLAN baseband chip, a WLAN device, an FDMA PPDU generation method, and an FDMA PPDU, to resolve problems of high costs and poor compatibility of a WLAN baseband chip supporting sending of a WUR frame in a form of an FDMA PPDU in related technologies. The technical solutions are as follows:

According to a first aspect, a WLAN baseband chip is provided. The WLAN baseband chip includes a memory and an inverse fast Fourier transform (IFFT). The WLAN baseband chip is configured to obtain, based on a subcarrier coefficient sequence in the memory, a subcarrier coefficient corresponding to a subcarrier set. The subcarrier set includes n subcarrier groups, any subcarrier group includes a plurality of continuous subcarriers, any two subcarrier groups are discontinuous, all subcarriers in the subcarrier set are in one frequency band, n is an integer greater than or equal to 2, and the n subcarrier groups correspond to n WLAN devices.

The WLAN baseband chip is further configured to obtain n SYNC sequences of the n WLAN devices based on SYNC sequences stored in the memory. Each SYNC sequence corresponds to one WLAN device, the n SYNC sequences include m LDR SYNC sequences and n−m HDR SYNC sequences, and m is a positive integer less than or equal to n.

The WLAN baseband chip is further configured to obtain n data streams corresponding to the n WLAN devices, and perform duplicating processing on m data streams in the n data streams, to obtain m data sequences on which the duplicating processing has been performed and n−m remaining data streams. The duplicating processing includes: duplicating, once, each bit in a data stream on which the duplicating processing is to be performed, and inserting the duplicate bit beside the duplicated bit.

The WLAN baseband chip is further configured to obtain m pieces of to-be-modulated data based on the m LDR SYNC sequences and the m data sequences on which the duplicating processing has been performed, and obtain n−m pieces of to-be-modulated data based on the n−m HDR SYNC sequences and the n−m remaining data streams, to obtain n pieces of to-be-modulated data.

The WLAN baseband chip is further configured to perform postprocessing on the n pieces of to-be-modulated data to obtain an FDMA PPDU. The postprocessing includes: sequentially and respectively modulating bits in the n pieces of to-be-modulated data to the n subcarrier groups of the corresponding WLAN devices based on the subcarrier coefficient to obtain a frequency-domain symbol sequence, and processing each symbol in the frequency-domain symbol sequence by using the IFFT circuit, to obtain each time-domain symbol.

In the FDMA PPDU generation process, the WLAN baseband chip modulates data of the plurality of WLAN devices to carriers before IFFT (that is, in frequency domain). Therefore, a WLAN chip is modified slightly, and costs of a WLAN baseband chip supporting sending of a WUR frame of an FDMA PPDU are reduced. Because a length of a time-domain symbol of an LDR data part is twice a length of a time-domain symbol of an HDR data part, direct modulation leads to a result that time-domain symbols having different lengths cannot be obtained through IFFT. Therefore, each bit in the LDR data part is modulated twice by using a short time-domain symbol as a reference. In this way, LDR data of two same short time-domain symbols forms one long time-domain symbol, to implement compatibility with two types of symbols.

Optionally, the postprocessing further includes: intercepting a half of the time-domain symbol to obtain a short time-domain symbol. For example, intercepting the half of the time-domain symbol may be: intercepting the first half of sampling point data included in the time-domain symbol. A non-802.11ba WLAN includes only a long (4 μs) time-domain symbol. Therefore, a hardware circuit of a non-802.11ba WLAN baseband chip does not support a short (2 μs) time-domain symbol. To improve compatibility, in the foregoing solution, a long time-domain symbol is generated still by using an IFFT circuit of a common WLAN baseband chip, and then, the long time-domain symbol is truncated to meet a requirement of 802.11ba.

In an example embodiment, the subcarrier coefficient includes n subcarrier coefficient sets corresponding to the n WLAN devices, and that the WLAN baseband chip performs the postprocessing on the n pieces of to-be-modulated data to obtain the FDMA PPDU includes the following two cases:

In a first case, the WLAN baseband chip is configured to perform OOK modulation, in response to a fact that to-be-modulated data corresponding to each WLAN device is a SYNC sequence, on a subcarrier coefficient set and a SYNC sequence that correspond to a target WLAN device, to modulate the SYNC sequence to a subcarrier group of the corresponding WLAN device, to obtain the frequency-domain symbol sequence. The target WLAN device is any one of the n WLAN devices.

Alternatively, the WLAN baseband chip is configured to perform, in response to a fact that a SYNC sequence corresponding to a to-be-modulated data sequence is an HDR SYNC sequence, OOK modulation on a subcarrier coefficient set and first modulation data that correspond to a target WLAN device, to modulate the first modulation data to a subcarrier group of the corresponding WLAN device, to obtain the frequency-domain symbol sequence, where the first modulation data includes a SYNC sequence and/or a data sequence.

For example, that the WLAN baseband chip is configured to perform the OOK modulation on the SYNC sequence corresponding to the target WLAN device and the subcarrier coefficient set corresponding to the target WLAN device in the subcarrier coefficient may mean that the WLAN baseband chip is configured to multiply the SYNC sequence corresponding to the target WLAN device by the subcarrier coefficient set corresponding to the target WLAN device in the subcarrier coefficient. Similarly, that the WLAN baseband chip is configured to perform the OOK modulation on the first modulation data corresponding to the target WLAN device and the subcarrier coefficient set corresponding to the target WLAN device in the subcarrier coefficient may mean that the WLAN baseband chip is configured to multiply the first modulation data corresponding to the target WLAN device by the subcarrier coefficient set corresponding to the target WLAN device in the subcarrier coefficient.

Optionally, the WLAN baseband chip is configured to perform extension processing on the subcarrier coefficient, to obtain an extended subcarrier coefficient. The extended subcarrier coefficient includes a primary subcarrier coefficient and a secondary subcarrier coefficient, and the secondary subcarrier coefficient is determined based on the primary subcarrier coefficient. In addition, the WLAN baseband chip is further configured to perform OOK modulation, in response to a fact that a to-be-modulated data sequence includes a data sequence whose corresponding SYNC sequence is an LDR SYNC sequence, on an extended subcarrier coefficient set and first modulation data that correspond to a target WLAN device, to modulate the first modulation data to a subcarrier group of the corresponding WLAN device, to obtain the frequency-domain symbol sequence. The first modulation data includes a SYNC sequence and/or a data sequence, the data sequence is data other than a SYNC sequence in to-be-modulated data, and the target WLAN device is any WLAN device in the n WLAN devices. The extension processing includes duplicating processing, phase rotation processing, or the like.

In an example embodiment, the WLAN baseband chip obtains a second amount of sampling point data in a short time-domain symbol, and adds the second amount of sampling point data to the front of the short time-domain symbol, to obtain a time-domain symbol into which a GI has been inserted. The second amount of sampling point data is sampling point data in a tail part of the short time-domain symbol, and a value of the second amount is less than a value of a first amount.

The WLAN baseband chip is further configured to perform windowing processing on the time-domain symbol into which the GI has been inserted, to obtain a time-domain symbol on which the windowing processing has been performed, and perform random processing on the time-domain symbol on which the windowing processing has been performed, to obtain a time-domain symbol on which the random processing has been performed. The random processing includes randomization processing and cyclic shift randomization processing.

The WLAN baseband chip is further configured to perform CSD processing on the time-domain symbol on which the random processing has been performed, and obtain the FDMA PPDU based on the time-domain symbol on which the CSD processing has been performed.

In a second case, the WLAN baseband chip is configured to perform random processing on second modulation data, to obtain modulation data on which the random processing has been performed. The random processing includes randomization processing and cyclic shift randomization processing, and the second modulation data includes a SYNC sequence or a data sequence.

The WLAN baseband chip is configured to perform OOK modulation on the modulation data on which the random processing has been performed and the subcarrier coefficient, to modulate the modulation data on which the random processing has been performed to a subcarrier group of a corresponding WLAN device, to obtain the frequency-domain symbol sequence.

Optionally, the WLAN baseband chip is further configured to perform extension processing on the subcarrier coefficient, to obtain an extended subcarrier coefficient. The extended subcarrier coefficient includes a primary subcarrier coefficient and a secondary subcarrier coefficient, and the secondary subcarrier coefficient is determined based on the primary subcarrier coefficient.

The WLAN baseband chip is configured to perform the OOK modulation on the modulation data on which the random processing has been performed and the extended subcarrier coefficient, to modulate the modulation data on which the random processing has been performed to the subcarrier group of the corresponding WLAN device, to obtain the frequency-domain symbol sequence.

Optionally, the WLAN baseband chip is configured to perform the OOK modulation on a subcarrier coefficient set corresponding to the target WLAN device and a CSD value, to obtain the frequency-domain symbol sequence. The target WLAN device is any WLAN device in the n WLAN devices, and the CSD value Y meets:

$$Y = s_i m_i \exp(j 2 \Pi k \Delta_{F,WUR}(-T_{CSD}^{n_{tx}} - T_{CSR,i})),$$

where $s_i$ is an $i^{th}$ data value in to-be-modulated data corresponding to the target WLAN device, $m_i$ is a data value that is obtained after the random processing and that corresponds to an $i^{th}$ data value in the modulation data on which the random processing has been performed, k is a subcarrier sequence number, $\Delta_{F,WUR}$ is a subcarrier spacing value, $T_{CSD}{}^{n_{tx}}$ is a CSD value of an $n_{tx}{}^{th}$ antenna in the target WLAN device, and $T_{CSR,i}$ is a CSR value that corresponds to the target WLAN device and that is of an $i^{th}$ data value in the data sequence on which the duplicating processing has been performed.

Optionally, the WLAN baseband chip obtains a second amount of sampling point data in a short time-domain symbol, and adds the second amount of sampling point data to the front of the short time-domain symbol, to obtain a time-domain symbol into which a GI has been inserted. The second amount of sampling point data is sampling point data in a tail part of the short time-domain symbol, and a value of the second amount is less than a value of a first amount.

The WLAN baseband chip is configured to perform windowing processing on the time-domain symbol into which the GI has been inserted, and obtain the FDMA PPDU based on the time-domain symbol on which the windowing processing has been performed.

In this application, compared with the WLAN baseband chip in the first case, for the WLAN baseband chip in the second case, processing implemented in time domain in a process of generating a WUR frame of an FDMA PPDU can be further reduced (in other words, operations on data obtained after IFFT can be reduced), to further implement processing in frequency domain, and ensure "normalization" processing in time domain, to implement compatibility with a communications standard supporting frequency-domain processing, namely, compatibility with a physical layer link supporting a communications standard such as IEEE 802.11ac/ax.

According to a second aspect, a WLAN device is provided. The WLAN device includes the WLAN baseband chip in the first aspect.

According to a third aspect, an FDMA PPDU generation method is provided. The method includes: obtaining, based on a subcarrier coefficient sequence, a subcarrier coefficient corresponding to a subcarrier set, where the subcarrier set includes n subcarrier groups, any subcarrier group includes a plurality of continuous subcarriers, any two subcarrier groups are discontinuous, all subcarriers in the subcarrier set are in one frequency band, n is an integer greater than or equal to 2, and the n subcarrier groups correspond to n WLAN devices; then, obtaining n SYNC sequences of the n WLAN devices based on SYNC sequences, where each SYNC sequence corresponds to one WLAN device, the n SYNC sequences include m LDR SYNC sequences and n−m HDR SYNC sequences, and m is a positive integer less than or equal to n. The method further includes obtaining n data streams corresponding to the n WLAN devices, and performing duplicating processing on m data streams in the n data streams, to obtain m data sequences on which the duplicating processing has been performed and n−m remaining data streams, where the duplicating processing includes: duplicating, once, each bit in a data stream on which duplicating processing is to be performed, and inserting the duplicate bit beside the duplicated bit; obtaining m pieces of to-be-modulated data based on the m LDR SYNC sequences and the m data sequences on which the duplicating processing has been performed, and obtaining n−m pieces of to-be-modulated data based on the n−m HDR SYNC sequences and the n−m remaining data streams, to obtain n pieces of to-be-modulated data; and then, performing postprocessing on the n pieces of to-be-modulated data to obtain a frequency division multiple access FDMA PPDU, where the postprocessing includes: sequentially and respectively modulating bits in the n pieces of to-be-modulated data to the n subcarrier groups of the corresponding WLAN devices based on the subcarrier coefficient to obtain a frequency-domain symbol sequence, and processing each symbol in the frequency-domain symbol sequence to obtain each time-domain symbol.

In the method provided in this application, in the FDMA PPDU generation process, data of the plurality of WLAN devices is modulated to carriers before IFFT (that is, in frequency domain). Therefore, a WLAN chip is modified slightly, and costs of a WLAN baseband chip supporting sending of a WUR frame of an FDMA PPDU are reduced. Because a length of a time-domain symbol of an LDR data part is twice a length of a time-domain symbol of an HDR data part, direct modulation leads to a result that time-domain symbols having different lengths cannot be obtained through IFFT. Therefore, each bit in the LDR data part is modulated twice by using a short time-domain symbol as a reference. In this way, LDR data of two same short time-domain symbols forms one long time-domain symbol, to implement compatibility with two types of symbols.

Optionally, in the subcarrier coefficient sequence in the first aspect and the second aspect, every two non-zero coefficients are spaced by at least one zero coefficient. For example, the subcarrier coefficient sequence includes p subcarrier coefficients, p is an odd number, values of a $2j^{th}$ subcarrier coefficient and a center subcarrier coefficient are zero, a value of a $(2j+1)^{th}$ subcarrier coefficient other than the center subcarrier coefficient is a non-zero value, j<p, and both j and p are positive integers. The center subcarrier coefficient is a $((p+1)/2)^{th}$ subcarrier coefficient.

In this application, an implementation of performing, by the WLAN baseband chip, the postprocessing on the n pieces of to-be-modulated data to obtain the FDMA PPDU includes but is not limited to the following two implementations:

In a first implementation, first, bits in the n pieces of to-be-modulated data are sequentially and respectively modulated to the n subcarrier groups of the corresponding WLAN devices based on the subcarrier coefficient to obtain the frequency-domain symbol sequence.

For example, a manner of sequentially and respectively modulating the bits in the n pieces of to-be-modulated data to the n subcarrier groups of the corresponding WLAN devices based on the subcarrier coefficient to obtain the frequency-domain symbol sequence includes but is not limited to the following manner:

responding to a fact that modulated data corresponding to each WLAN device is a SYNC sequence, and performing OOK modulation on a subcarrier coefficient set and a SYNC sequence that correspond to a target WLAN device, to modulate the SYNC sequence to a subcarrier group of the corresponding WLAN device, to obtain the frequency-domain symbol sequence, where the target WLAN device is any one of the n WLAN devices; or responding to a fact that a SYNC sequence corresponding to a to-be-modulated data sequence is an HDR SYNC sequence, and performing OOK modulation on a subcarrier coefficient set and first modulation data that correspond to a target WLAN device, to modulate the first modulation data to a subcarrier group of the corresponding WLAN device, to obtain the frequency-domain symbol sequence, where the first modulation data includes a SYNC sequence and/or a data sequence; or performing extension processing on the subcarrier coefficient, to obtain an extended subcarrier coefficient, where the extended subcarrier coefficient includes a primary subcarrier coefficient and a secondary subcarrier coefficient, and the secondary subcarrier coefficient is determined based on the primary subcarrier coefficient; and responding to a fact that a to-be-modulated data sequence includes a data sequence whose corresponding SYNC sequence is an LDR SYNC sequence, and performing OOK modulation on an extended subcarrier coefficient set and first modulation data that correspond to a target WLAN device, to modulate the first modulation data to a subcarrier group of the corresponding WLAN device, to obtain the frequency-domain symbol sequence, where the first modulation data includes a SYNC sequence and/or a data sequence, the data sequence is data other than a SYNC sequence in to-be-modulated data, and the target WLAN device is any WLAN device in the n WLAN devices.

Then, each symbol in the frequency-domain symbol sequence is processed to obtain each time-domain symbol. For example, a half of the time-domain symbol is intercepted to obtain a short time-domain symbol. A second amount of sampling point data in the short time-domain symbol is obtained, and the second amount of sampling point data is added to the short time-domain symbol, to obtain a time-domain symbol into which a GI has been inserted. The second amount of sampling point data is sampling point data in a tail part of the short time-domain symbol, and a value of the second amount is less than a value of a first amount. Windowing processing is performed on the time-domain symbol into which the GI has been inserted, to obtain a time-domain symbol on which the windowing processing has been performed. Random processing is performed on the time-domain symbol on which the windowing processing has been performed, to obtain a time-domain symbol on which the random processing has been performed. The random processing includes randomization processing and cyclic shift randomization processing. CSD processing is performed on the time-domain symbol on which the random processing has been performed, and the FDMA PPDU is obtained based on the time-domain symbol on which the CSD processing has been performed. A process of obtaining the FDMA PPDU based on the time-domain symbol on which the CSD processing has been performed may include: performing intermediate radio frequency processing on the time-domain symbol on which the CSD processing has been performed, to obtain the FDMA PPDU.

It should be noted that a guard subcarrier may be inserted into to-be-processed data. The to-be-processed data may be the frequency-domain symbol sequence, the time-domain symbol obtained after processing, the short time-domain symbol, or the like. For example, guard subcarriers may be inserted into two ends of the subcarrier coefficient sequence.

In a second implementation, a process of performing the postprocessing on the n pieces of to-be-modulated data to obtain the FDMA PPDU includes:

First, random processing is performed on second modulation data, to obtain modulation data on which the random processing has been performed. The random processing includes randomization processing and cyclic shift randomization processing, and the second modulation data includes a SYNC sequence or a data sequence. Then, OOK modulation is performed on the modulation data on which the random processing has been performed and the subcarrier coefficient, to modulate the modulation data on which the random processing has been performed to a subcarrier group of a corresponding WLAN device, to obtain the frequency-domain symbol sequence.

For example, CSD processing may be further performed on the modulation data on which the random processing has been performed and the subcarrier coefficient, to obtain the frequency-domain symbol sequence.

Optionally, when there is a sub PPDU in an LDR mode, before the CSD processing is performed on the modulation data on which the random processing has been performed and the subcarrier coefficient, to obtain the frequency-domain symbol sequence, extension processing may be further performed on the subcarrier coefficient to obtain an extended subcarrier coefficient, where the extended subcarrier coefficient includes a primary subcarrier coefficient and a secondary subcarrier coefficient, and the secondary subcarrier coefficient is determined based on the primary subcarrier coefficient. The CSD processing is performed based on the modulation data on which the random processing has been performed and the extended subcarrier coefficient, to obtain the frequency-domain symbol sequence.

A process of performing the CSD processing on the modulation data on which the random processing has been performed and the subcarrier coefficient, to obtain the frequency-domain symbol sequence includes: performing the OOK modulation on a subcarrier coefficient set corresponding to the target WLAN device and a CSD value, to obtain the frequency-domain symbol sequence. The target WLAN device is any WLAN device in the n WLAN devices, and the CSD value Y meets:

$$Y = s_i m_i \exp(j2\Pi k \Delta_{F,WUR}(-T_{CSD}^{n_{tx}} - T_{CSR,i})),$$

where $s_i$ is an $i^{th}$ data value in to-be-modulated data corresponding to the target WLAN device, $m_i$ is a data value that is obtained after the random processing and that corresponds to an $i^{th}$ data value in the modulation data on which the random processing has been performed, k is a subcarrier sequence number, $\Delta_{F,WUR}$ is a subcarrier spacing value, $T_{CSD}^{n_{tx}}$ is a CSD value of an $n_{tx}^{th}$ antenna in the target WLAN device, and $T_{CSR,i}$ is a CSR value that corresponds to the target WLAN device and that is of an $i^{th}$ data value in a data sequence on which the duplicating processing has been performed.

In this application, corresponding to the two implementations of generating the frequency-domain symbol sequence through modulation based on the SYNC sequence, the data sequence, and the subcarrier coefficient, an implementation method of generating the FDMA PPDU based on the time-domain symbol includes but is not limited to the following two implementations. The time-domain symbol includes a first amount of sampling point data.

Then, each symbol in the frequency-domain symbol sequence may be further processed to obtain each time-domain symbol. A half of a received time-domain symbol on which IFFT has been performed is intercepted to obtain a short time-domain symbol. A second amount of sampling point data in the short time-domain symbol is obtained, and the second amount of sampling point data is added to the short time-domain symbol, to obtain a time-domain symbol into which a GI has been inserted. The second amount of sampling point data is sampling point data in a tail part of the short time-domain symbol, and a value of the second amount is less than a value of the first amount. Windowing processing is performed on the time-domain symbol into which the GI has been inserted, to obtain the FDMA PPDU. A process of obtaining the FDMA PPDU based on the time-domain symbol on which the windowing processing has been performed may include: performing intermediate radio frequency processing on the time-domain symbol on which the windowing processing has been performed, to obtain the FDMA PPDU.

According to a fourth aspect, a frequency division multiple access physical layer convergence procedure protocol data unit is provided. The frequency division multiple access physical layer convergence procedure protocol data unit includes: a plurality of sub frequency division multiple access physical layer convergence procedure protocol data units PPDUs, where each sub PPDU has a different frequency range, each sub PPDU includes a synchronization SYNC sequence and a data sequence, and the data sequence includes a plurality of data symbols. When a target sub PPDU in the plurality of sub PPDUs is configured to be in a low rate LDR mode, every b adjacent data symbols in a data sequence in the target sub PPDU carry same data, and b is a positive integer.

According to a fifth aspect, a WLAN device is provided. The WLAN device includes a processor and a memory. The memory is configured to store a computer program, where the computer program includes a program instruction. The processor is configured to invoke the computer program to implement the FDMA PPDU generation method in the third aspect.

According to a sixth aspect, a computer storage medium is provided. The computer storage medium stores an instruction, and when the instruction is executed by a processor, the FDMA PPDU generation method in the third aspect is implemented.

According to a seventh aspect, a communications apparatus is provided. The apparatus includes a transceiver, a memory, and a processor. The transceiver, the memory, and the processor communicate with each other through an internal connection path. The memory is configured to store an instruction. The processor is configured to execute the instruction stored in the memory, to control the transceiver to receive a signal, and control the transceiver to send a signal. In addition, when the processor executes the instruction stored in the memory, the processor is enabled to perform the FDMA PPDU generation method in the third aspect.

In an example, there are one or more processors, and there are one or more memories.

In an example, the memory may be integrated with the processor, or the memory and the processor are separately disposed.

In a specific implementation process, the memory may be a non-transitory memory, for example, a read only memory (ROM), and the memory and the processor may be integrated on a same chip, or may be disposed on different chips. A type of the memory and a manner of disposing the memory and the processor are not limited in this application.

According to an eighth aspect, a computer program (product) is provided. The computer program (product) includes computer program code. When the computer program code is run by a computer, the computer is enabled to perform the FDMA PPDU generation method in the third aspect.

According to a ninth aspect, a chip is provided, and includes a processor, configured to invoke an instruction from a memory and runs the instruction stored in the memory, so that a communications device in which the chip is mounted is enabled to perform the FDMA PPDU generation method in the third aspect.

According to a tenth aspect, another chip is provided, and includes an input interface, an output interface, a processor, and a memory. The input interface, the output interface, the processor, and the memory are connected through an internal connection path. The processor is configured to execute code in the memory. When the code is executed, the processor is configured to perform the FDMA PPDU generation method in the third aspect.

DESCRIPTION OF EMBODIMENTS

To make the objectives, technical solutions, and advantages of this application clearer, the following further describes the implementations of this application in detail with reference to the accompanying drawings.

IEEE 802.11 is a series of WLAN communications standards. The IEEE 802.11 supports two types of physical layer frames. The two types of frames include a basic PPDU and an FDMA PPDU. The basic PPDU supports communication performed, on a 20-megahertz (MHz) frequency band, with one WLAN device having a WUR receiver. WUR is a WLAN energy-efficient mechanism defined in IEEE 802.11ba. A new physical layer format is introduced into the WUR. A WUR frame in a form of an FDMA PPDU supports communication performed, on a 40 MHz/80 MHz frequency band through FDMA, with a plurality of WLAN devices having a WUR receiver. An FDMA PPDU used to communicate with a plurality of WLAN devices on a 40 MHz frequency band is referred to as a 40 MHz FDMA PPDU, and an FDMA PPDU used to communicate with a plurality of WLAN devices on an 80 MHz frequency band is referred to as an 80 MHz FDMA PPDU. For example, if an FDMA PPDU supports simultaneous communication performed, on a 40 MHz frequency band, with two WLAN devices, it may be considered that each WLAN device corresponds to a 20 MHz frequency bandwidth. If an FDMA PPDU supports simultaneous communication performed, on an 80 MHz frequency band, with four WLAN devices, it may be considered that each WLAN device corresponds to a 20 MHz frequency bandwidth.

Figure 1A:
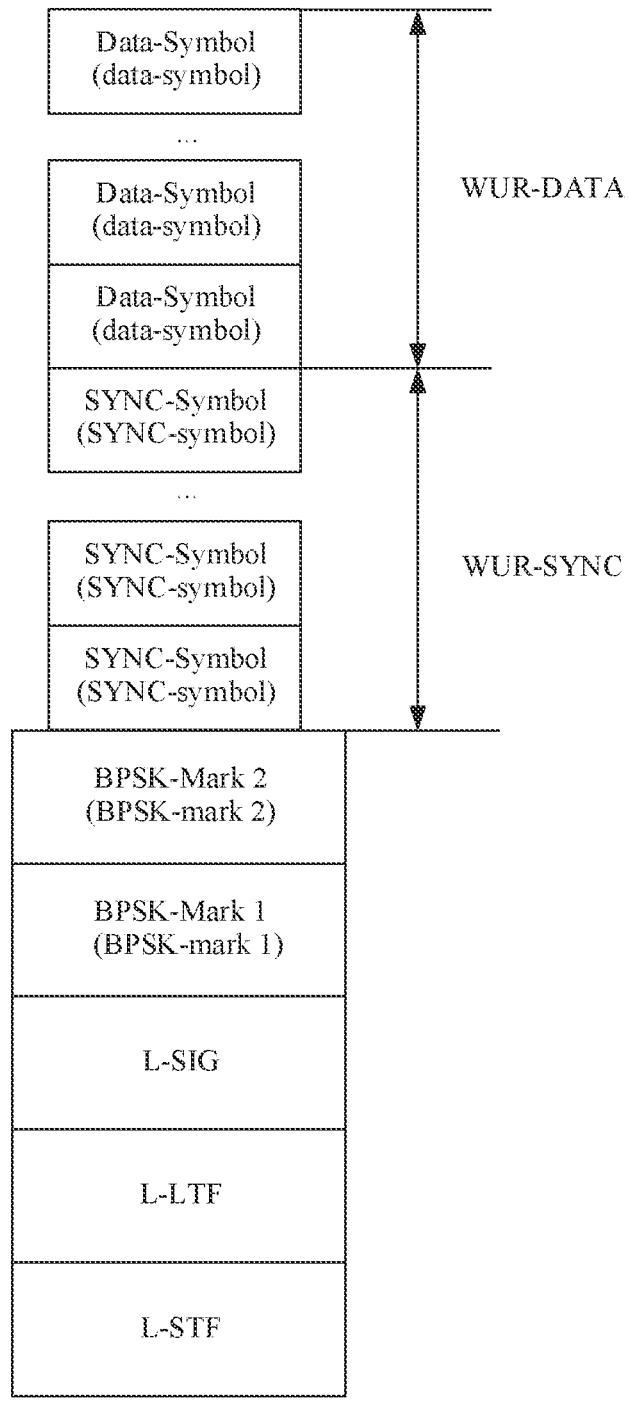
FIG. 1A is a schematic diagram of a format of a basic PPDU according to an embodiment of this application.

FIG. 1A is a schematic diagram of a format of a basic PPDU according to an embodiment of this application. The basic PPDU includes a legacy short training field (L-STF), a legacy long training field (L-LTF), a legacy signal (L-SIG) field, a binary phase shift keying (BPSK)-mark 1, a BPSK-mark 2, a WUR-synchronization (SYNC) field (also referred to as a SYNC sequence), and a WUR-data field (also referred to as a data sequence). The WUR-SYNC field includes a plurality of SYNC symbols (SYNC-Symbol). The WUR-DATA field includes a plurality of data symbols (Data-Symbol).

Figure 1B:
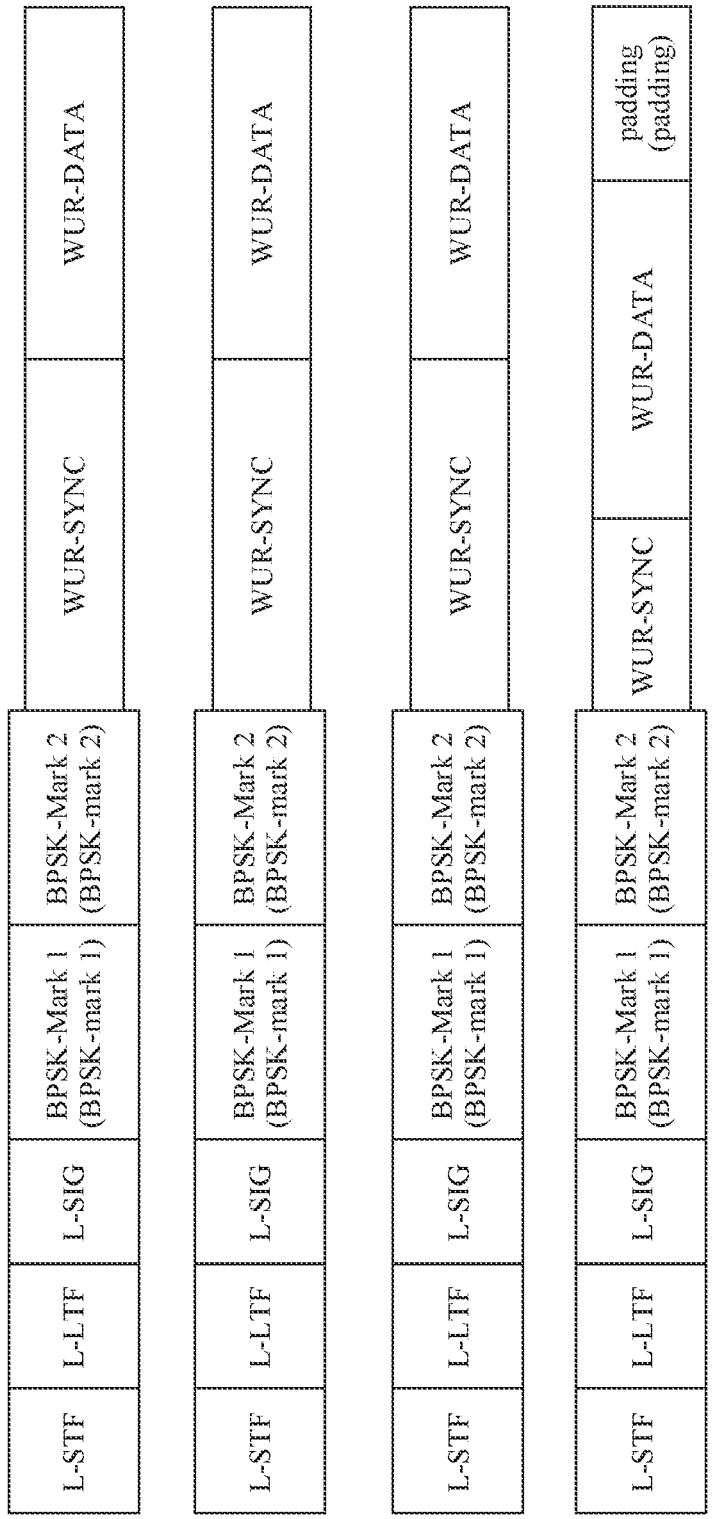
FIG. 1B is a schematic diagram of a format of an 80 MHz FDMA PPDU according to an embodiment of this application.

FIG. 1B is a schematic diagram of a format of an 80 MHz FDMA PPDU according to an embodiment of this application. The 80 MHz FDMA PPDU includes four sub PPDUs corresponding to four WLAN devices, each sub PPDU includes the L-STF, the L-LTF, the L-SIG, the BPSK-mark 1, the BPSK-mark 2, the WUR-SYNC field, and the WUR-DATA field in the basic PPDU shown in FIG. 1A. The WUR-SYNC field includes a plurality of SYNC-Symbols. The WUR-DATA field includes a plurality of Data-Symbols. Optionally, the sub PPDU may further include a padding field. The padding field is used to pad the sub PPDU, so that sub PPDUs in a same FDMA PPDU have a same length. FIG. 1B shows only a case in which a last sub PPDU in the four sub PPDUs includes a padding field.

It may be understood that if an FDMA PPDU is a 40 MHz FDMA PPDU, the FDMA PPDU includes two sub PPDUs corresponding to two WLAN devices, and a format of each sub PPDU is the same as a format of a sub PPDU in the 80 MHz FDMA PPDU.

In the basic PPDU and the FDMA PPDU, data in the WUR-SYNC field and the WUR-DATA field (collectively referred to as a WUR field) is data needing to be received by a WLAN device (a receive end), and it may be considered that the WUR field is a part actually needing to be processed by the WLAN device. The WUR field is generally generated through multi-carrier on off keying (MC-OOK) modulation. The MC-OOK means that an information bit is modulated to one FDMA symbol.

For example, the FDMA symbol may include an On-WG symbol, the On-WG symbol may include a 2 μs On-WG symbol and a 4 μs On-WG symbol, and the Off-WG symbol is of a zero-energy waveform. An MC-OOK modulation process includes: modulating each information bit in the WUR field to one On-WG symbol/Off-WG symbol. Each information bit in the SYNC sequence in the WUR field is modulated to one 2 μs On-WG symbol based on an IEEE 802.11 communications standard. A sub PPDU is configured to be a sub PPDU in an HDR mode or a sub PPDU in an LDR mode based on an HDR mode flag and an LDR mode flag delivered by media access control (MAC). When a mode of the sub PPDU is the HDR mode, each information bit in the data sequence in the WUR field is modulated to one 2 μs On-WG symbol, or when a mode of the sub PPDU is the LDR mode, each information bit in the data sequence in the WUR field is modulated to one 4 μs On-WG symbol.

It should be noted that in the basic PPDU shown in FIG. 1A and the 80 MHz FDMA PPDU shown in FIG. 1B, widths thereof may be considered as corresponding frequency bandwidths. It can be learned from the foregoing that frequency bandwidths of the basic PPDU and each sub PPDU in the 80 MHz FDMA PPDU are 20 MHz. An effective frequency bandwidth of the Off-WG symbol is 4 MHz. Therefore, effective frequency bandwidths of the WUR field in the basic PPDU and the WUR field in each sub PPDU in the 80 MHz FDMA PPDU are 4 MHz. Then, the widths of the WUR field in the basic PPDU shown in FIG. 1A and the widths of the WUR fields in the 80 MHz FDMA PPDU shown in FIG. 1B are less than a width of a part other than the WUR field.

Figure 2:
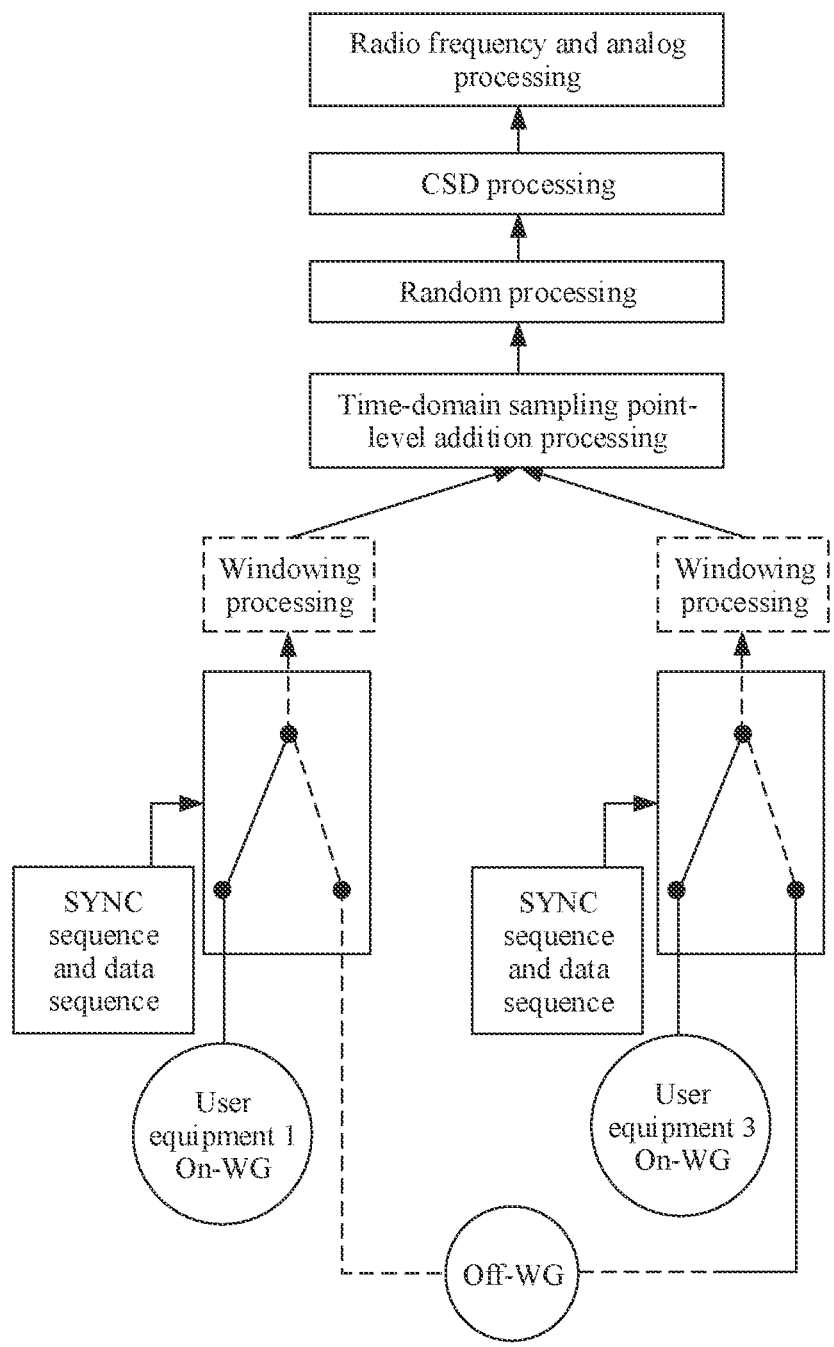
FIG. 2 is a schematic diagram of a process of generating, by a network device, an 80 MHz FDMA PPDU according to a related technology.

FIG. 2 is a schematic diagram of a process of generating, by a WLAN baseband chip, an 80 MHz FDMA PPDU. As shown in FIG. 2, currently, a method for generating, by the WLAN baseband chip, an 80 MHz FDMA PPDU includes: The WLAN baseband chip stores an Off-WG symbol, and a 2 μs On-WG time-domain symbol and a 4 μs On-WG time-domain symbol that correspond to different WLAN devices. For each of the four WLAN devices (that is, WLAN devices 1 to 4), that is, for a frequency band (channel 1 to channel 4) corresponding to each WLAN device, the WLAN baseband chip first performs OOK modulation on data in a SYNC sequence and a data sequence in a generated WUR field, to obtain a modulated time-domain symbol. Second, the WLAN baseband chip performs windowing (window) processing on the modulated time-domain symbol, to obtain a time-domain symbol on which the windowing processing has been performed. Then, the WLAN baseband chip performs time-domain sampling point-level addition processing on all time-domain symbols on which the windowing processing has been performed, to obtain processed time-domain symbols. Then, a network device sequentially and separately performs random processing (including randomization and cyclic shift randomization (cyclic shift random, CSR)), cyclic shift (CSD) processing, and radio frequency and analog (analog and RF) processing on the processed time-domain symbols, to obtain an 80 MHz FDMA PPDU.

A process of performing, by the WLAN baseband chip, the OOK modulation on the data in the SYNC sequence and the data sequence in the generated WUR field includes: When a sub PPDU corresponding to a WLAN device is configured to be in an HDR mode, the WLAN baseband chip modulates, by using the Off-WG symbol and a 2 μs On-WG time-domain symbol that corresponds to the WLAN device, data of each bit in a SYNC sequence and a data sequence to one Off-WG symbol/2 μs On-WG time-domain symbol. When a sub PPDU corresponding to a WLAN device is configured to be in an LDR mode, the WLAN baseband chip modulates, by using the Off-WG symbol and a 4 μs On-WG time-domain symbol that corresponds to the WLAN device, a SYNC sequence to one Off-WG symbol/2 μs On-WG time-domain symbol, and modulates each bit in a data sequence to one Off-WG symbol/4 μs On-WG time-domain symbol.

Therefore, a current WLAN baseband chip performs OOK modulation processing for each WLAN device based on a time-domain symbol, and then obtains an FDMA PPDU based on the modulated symbol. It may be understood that in the process of generating, by the current WLAN baseband chip, a WUR frame of an FDMA PPDU, processing is separately performed for different WLAN devices in time domain, namely, a plurality of users are "distinguished" between in time domain.

For example, multi-user (MU) processing introduced into IEEE 802.11c and IEEE 802.11ax standards includes: multi-user processing for different WLAN devices that is introduced by using an orthogonal frequency division multiple access (OFDMA) technology, and multi-user processing for different WLAN devices that is introduced by using a multi-user multi-input multi-output (MU-MIMO) antenna technology. The processing for different WLAN devices is performed in frequency domain. In other words, for example, the IEEE 802.11ac standard and the IEEE 802.11ax standard support "distinguishing" between a plurality of users in frequency domain.

In addition, if an FDMA PPDU is generated by using a method for generating, by the current WLAN baseband chip, a WUR frame of an FDMA PPDU, the current WLAN baseband chip needs to be modified greatly to separately perform processing for different WLAN devices in time domain, leading to high costs of a WLAN baseband chip supporting sending of a WUR frame of an FDMA PPDU.

In view of this, an embodiment of this application provides a WLAN baseband chip. The WLAN baseband chip includes a memory and an inverse fast Fourier transform (IFFT) circuit. The WLAN baseband chip is configured to obtain, based on a subcarrier coefficient sequence in the memory, a subcarrier coefficient corresponding to a subcarrier set. The subcarrier set includes n subcarrier groups, any subcarrier group includes a plurality of continuous subcarriers, any two subcarrier groups are discontinuous, all subcarriers in the subcarrier set are in one frequency band, n is an integer greater than or equal to 2, and the n subcarrier groups correspond to n WLAN devices. The memory storing the subcarrier coefficient sequence may be an independent circuit.

The WLAN baseband chip is configured to obtain n SYNC sequences of the n WLAN devices based on SYNC sequences stored in the memory, where each SYNC sequence corresponds to one WLAN device, the n SYNC sequences include m LDR SYNC sequences and n−m HDR SYNC sequences, and m is a positive integer less than or equal to n. A mode of a sub PPDU, in an FDMA PPDU, corresponding to an LDR SYNC sequence is an LDR mode. A mode of a sub PPDU, in the FDMA PPDU, corresponding to an HDR SYNC sequence is an HDR mode.

The WLAN baseband chip is configured to obtain n data streams corresponding to the n WLAN devices, and perform duplicating processing on m data streams in the n data streams, to obtain m data sequences on which the duplicating processing has been performed and n−m remaining data streams, where the duplicating processing includes: duplicating, once, each bit in a data stream on which duplicating processing is to be performed, and inserting the duplicate bit beside the duplicated bit.

The WLAN baseband chip is configured to obtain m pieces of to-be-modulated data based on the m LDR SYNC sequences and the m data sequences on which the duplicating processing has been performed, and obtain n−m pieces of to-be-modulated data based on the n−m HDR SYNC sequences and the n−m remaining data streams, to obtain n pieces of to-be-modulated data.

The WLAN baseband chip is configured to perform postprocessing on the n pieces of to-be-modulated data to obtain an FDMA PPDU, where the postprocessing includes: sequentially and respectively modulating bits in the n pieces of to-be-modulated data to the n subcarrier groups of the corresponding WLAN devices based on the subcarrier coefficient to obtain a frequency-domain symbol sequence, and processing each symbol in the frequency-domain symbol sequence by using an IFFT circuit, to obtain each time-domain symbol.

Optionally, that the WLAN baseband chip is configured to obtain, based on the subcarrier coefficient sequence in the memory, the subcarrier coefficient corresponding to the subcarrier set may include two cases. In a first case, the memory of the WLAN baseband chip directly stores the subcarrier coefficient corresponding to the subcarrier set. In a second case, the WLAN baseband chip maps the subcarrier coefficient sequence onto n continuous subcarrier groups of a particular frequency band, to obtain the subcarrier coefficient corresponding to the subcarrier set.

Every two non-zero coefficients in the subcarrier coefficient sequence are spaced by at least one zero coefficient. Optionally, the subcarrier coefficient sequence includes p subcarrier coefficients, p is an odd number, values of a $2j^{th}$ subcarrier coefficient and a center subcarrier coefficient are zero, a value of a $(2j+1)^{th}$ subcarrier coefficient other than the center subcarrier coefficient is a non-zero value, j<p, and both j and p are positive integers. The center subcarrier coefficient is a $((p+1)/2)^{th}$ subcarrier coefficient.

In the n subcarrier groups of the particular frequency band, each subcarrier group of the particular frequency band corresponds to one WLAN device. Then, one subcarrier coefficient that is obtained based on the n continuous subcarrier groups of the particular frequency band and the subcarrier coefficient sequence includes n subcarrier coefficient sets respectively corresponding to the n WLAN devices.

For example, for an 80 MHz FDMA PPDU, that n=4, p=13, a subcarrier set of a particular frequency band includes four continuous subcarrier groups [−103, −91], [−39, −27], [26, 38], and [90, 102], and a subcarrier coefficient sequence A is {A1, 0, A2, 0, A3, 0, 0, 0, A4, 0, A5, 0, A6} is used as an example. Then, the WLAN baseband chip separately maps the subcarrier coefficient sequence A onto the four continuous subcarrier groups: [−103, −91], [−39, −27], [26, 38], and [90, 102], to obtain one subcarrier coefficient Y. Each of the continuous subcarrier groups corresponds to one WLAN device. Then, the subcarrier coefficient Y includes four subcarrier coefficient sets corresponding to the four WLAN devices. To be specific, the subcarrier coefficient Y includes a subcarrier coefficient set Y1 corresponding to the subcarrier group [−103, −91], a subcarrier coefficient set Y2 corresponding to the subcarrier group [−39, −27], a subcarrier coefficient set Y3 corresponding to the subcarrier group [26, 38], and a subcarrier coefficient set Y4 corresponding to the subcarrier group [0, 102].

In this embodiment of this application, the WLAN baseband chip is configured to obtain n data streams corresponding to the n WLAN devices, and perform duplicating processing on m data streams in the n data streams, to obtain m data sequences on which the duplicating processing has been performed and n−m remaining data streams, where the duplicating processing includes: duplicating, once, each bit in a data stream on which the duplicating processing is to be performed, and inserting the duplicate bit beside the duplicated bit.

SYNC sequences corresponding to the m data streams in the n data streams are all LDR SYNC sequences, and correspondingly, SYNC sequences corresponding to the n−m data streams are all HDR SYNC sequences. When m=n, the WLAN baseband chip is configured to perform the duplicating processing on each of the n data streams to obtain n data sequences on which the duplicating processing has been performed.

It should be noted that the m data sequences on which the duplicating processing has been performed include a plurality of continuous data groups, each data group includes b pieces of same data, and b is a positive integer greater than or equal to 2. To be specific, in the data sequences on which the duplicating processing has been performed, starting from initial data, every b pieces of data are one data group, and all data in the data group is the same. In other words, it is assumed that the data sequences on which the duplicating processing has been performed include $Q_1, Q_2, Q_3, \ldots,$ and $Q_r$ (r pieces of data in total). $Q_1$ to $Q_b$ are the same, $Q_{b+1}$ to $Q_{2b}$ are the same, $Q_{2b+1}$ to $Q_{3b}$ are the same, b=r/2, and r is a positive integer greater than or equal to 4. For example, it is assumed that a data stream on which the duplicating processing is to be performed is 1, 2, 3. Then, a data sequence on which the duplicating processing has been performed is 1, 1, 2, 2, 3, 3.

Optionally, the n data streams that are obtained by the WLAN baseband chip and that correspond to the n WLAN devices may be data streams on which WUR encoding processing has been performed.

Figure 3:
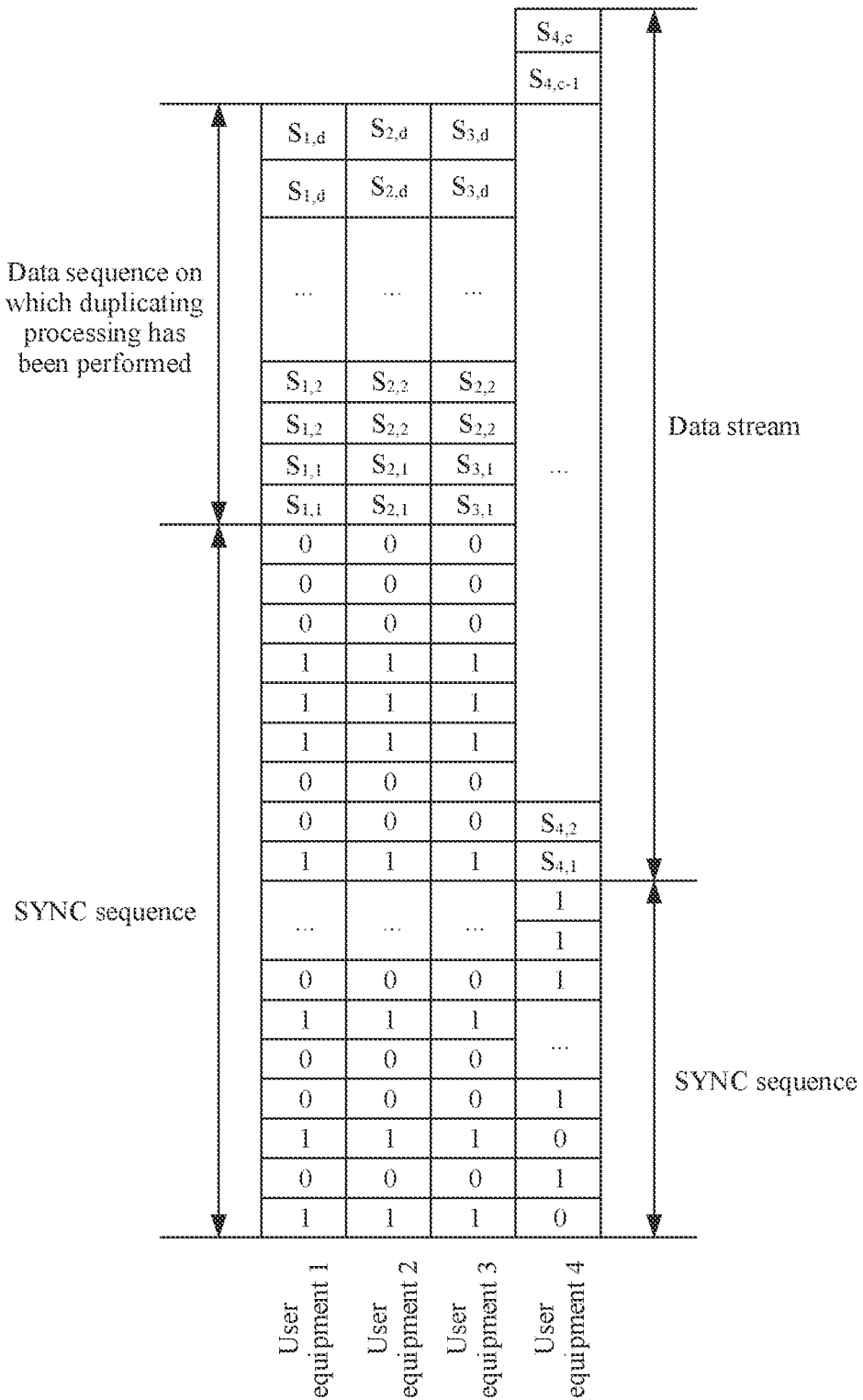
FIG. 3 is a schematic diagram of data in a SYNC sequence and a data stream/a data sequence on which duplicating processing has been performed according to an embodiment of this application.

For example, an 80 MHz FDMA PPDU includes four sub PPDUs, and the four sub PPDUs respectively correspond to four WLAN devices (WLAN devices 1 to 4). It is assumed that SYNC sequences corresponding to the WLAN devices 1 to 3 are LDR SYNC sequences, and the LDR SYNC sequences corresponding to the WLAN devices 1 to 3 each are 1, 0, 1, 0, . . . , 1, 0, 1, 0. A SYNC sequence corresponding to the WLAN device 4 is an HDR SYNC sequence, and the HDR SYNC sequence corresponding to the WLAN device 4 is 0, 1, 0, 1, . . . , 0, 1, 0, 1. FIG. 3 is a schematic diagram of data in a SYNC sequence and a data sequence on which the duplicating processing has been performed or a data stream. As shown in FIG. 3, data in the SYNC sequence corresponding to the WLAN device 1 and a data sequence on which the duplicating processing has been performed and that corresponds to the WLAN device 1 is 1, 0, 1, 0, . . . , 1, 0, 1, 0, $S_{1,1}, S_{1,1}, S_{1,2}, S_{1,2}, S_{1,3}, S_{1,3}, \ldots, S_{1,d}$, and $S_{1,d}$. Data in the SYNC sequence corresponding to the WLAN device 2 and a data sequence on which the duplicating processing has been performed and that corresponds to the WLAN device 2 is 1, 0, 1, 0, . . . , 1, 0, 1, 0, $S_{2,1}, S_{2,1}, S_{2,2}, S_{2,2}, S_{2,3}, S_{2,3}, \ldots, S_{2,d}, S_{2,d}$. Data in the SYNC sequence corresponding to the WLAN device 3 and a data sequence on which the duplicating processing has been performed and that corresponds to the WLAN device 3 is 1, 0, 1, 0, . . . , 1, 0, 1, 0, $S_{3,1}, S_{3,1}, S_{3,2}, S_{3,2}, S_{3,3}, S_{3,3}, \ldots, S_{3,d}, S_{3,d}$. The SYNC sequence and a data stream that correspond to the WLAN device 4 are 0, 1, 0, 1, . . . , 0, 1, 0, 1, $S_{4,1}, S_{4,2}, S_{4,3}, \ldots, S_{4,c-1}, S_{4,c}$ In this embodiment of this application, the WLAN baseband chip is configured to obtain m pieces of to-be-modulated data based on the m LDR SYNC sequences and the m data sequences on which the duplicating processing has been performed, and obtain n−m pieces of to-be-modulated data based on the n−m HDR SYNC sequences and the n−m remaining data streams, to obtain n pieces of to-be-modulated data.

Optionally, the WLAN baseband chip is configured to perform splicing processing on the m LDR SYNC sequences and the m data sequences on which the duplicating processing has been performed, to obtain the m pieces of to-be-modulated data, where the to-be-modulated data includes an LDR SYNC sequence and a data sequence, and the data sequence is a data sequence on which the duplicating processing has been performed and that corresponds to the SYNC sequence. The WLAN baseband chip is configured to perform the splicing processing on the n−m pieces of to-be-modulated data obtained based on the n−m HDR SYNC sequences and the n−m remaining data streams to obtain the n−m pieces of to-be-modulated data, to obtain the n−m pieces of to-be-modulated data, where the n−m pieces of to-be-modulated data include an HDR SYNC sequence and a data sequence. When m=n, n−m=0. Therefore, the WLAN baseband chip cannot obtain n−m pieces of modulation data. It may be considered that the WLAN baseband chip does not perform the step of obtaining the n−m pieces of to-be-modulated data based on the n−m HDR SYNC sequences and the n−m remaining data streams.

It should be noted that because the n pieces of to-be-modulated data are obtained based on the SYNC sequences, it may be considered that the n pieces of to-be-modulated data respectively correspond to the n SYNC sequences, that is, respectively correspond to the n WLAN devices. In addition, if one piece of to-be-modulated data includes a SYNC sequence and a data sequence, it may be considered that there is a correspondence between the SYNC sequence and the data sequence.

Further, optionally, the WLAN baseband chip may be configured to perform padding processing, in response to a fact that a data amount of any piece of to-be-modulated data in the n pieces of to-be-modulated data is not equal to a data amount of other to-be-modulated data, on to-be-padded to-be-modulated data in the n pieces of to-be-modulated data, to obtain to-be-modulated data on which the padding processing has been performed, to obtain n pieces of to-be-modulated data having a same data amount. A data amount of the to-be-padded to-be-modulated data is less than a data amount of target to-be-modulated data, and the target to-be-modulated data is to-be-modulated data having a largest data amount in the n pieces of to-be-modulated data. The to-be-modulated data on which the padding processing has been performed includes a SYNC sequence and a data sequence, and the data sequence includes a data sequence on which the duplicating processing has been performed and a padding sequence (which forms the foregoing padding field). A value of each piece of data in the padding sequence is a reference value. For example, the reference value may be 1. A quantity of reference values (namely, a size of the padding sequence) may be delivered by an upper-layer protocol.

Figure 4:
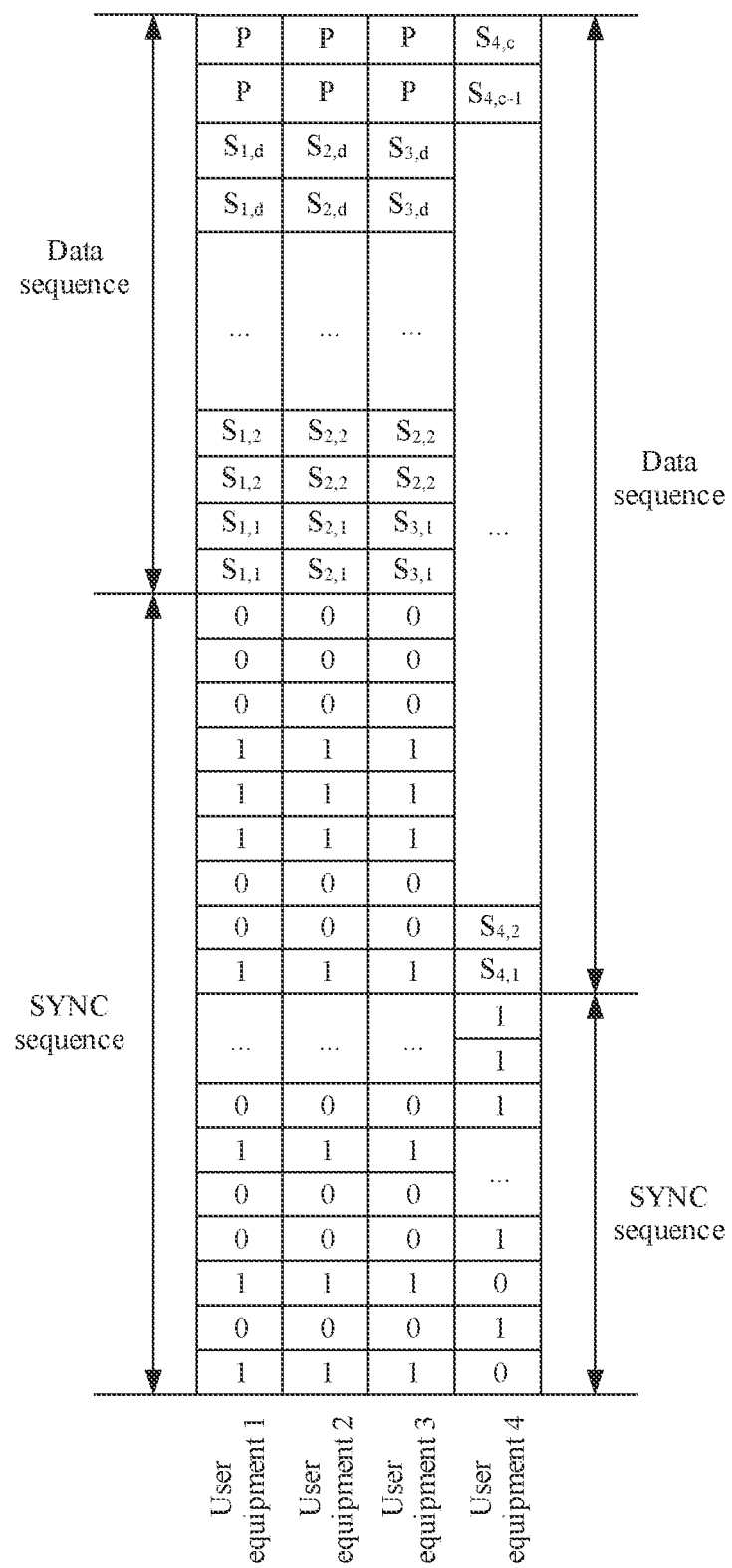
FIG. 4 is a schematic diagram of data in SYNC sequences and to-be-modulated data sequences according to an embodiment of this application.

For example, FIG. 4 is a schematic data diagram of to-be-modulated data (that is, a SYNC sequence and a data sequence). As shown in FIG. 4, the to-be-modulated data corresponding to the WLAN device 1 is 1, 0, 1, 0, . . . , 1, 0, 1, 0, $S_{1,1}, S_{1,1}, S_{1,2}, S_{1,2}, S_{1,3}, S_{1,3}, \ldots, S_{1,d}, S_{1,d}$, P, P. The to-be-modulated data corresponding to the WLAN device 2 is 1, 0, 1, 0, . . . , 1, 0, 1, 0, $S_{2,1}, S_{2,1}, S_{2,2}, S_{2,2}, S_{2,3}, S_{2,3}, \ldots, S_{2,d}, S_{2,d}$, P, P. The to-be-modulated data corresponding to the WLAN device 3 is 1, 0, 1, 0, . . . , 1, 0, 1, 0, $S_{3,1}, S_{3,1}, S_{3,2}, S_{3,2}, S_{3,3}, S_{3,3}, \ldots, S_{3,d}, S_{3,d}$, P, P. The to-be-modulated data corresponding to the WLAN device 4 is 0, 1, 0, 1, . . . , 0, 1, 0, 1, $S_{4,1}, S_{4,2}, S_{4,3}, \ldots, S_{4,c-1}, S_{4,c}$. P is data in a padding sequence.

In this embodiment of this application, the WLAN baseband chip is configured to perform the postprocessing on the n pieces of to-be-modulated data to obtain the FDMA PPDU, where the postprocessing includes: sequentially and respectively modulating the bits in the n pieces of to-be-modulated data to the n subcarrier groups of the corresponding WLAN devices based on the subcarrier coefficient to obtain the frequency-domain symbol sequence, and processing each symbol in the frequency-domain symbol sequence by using the IFFT circuit to obtain each time-domain symbol. For the step in which the WLAN baseband chip is configured to perform the postprocessing on the n pieces of to-be-modulated data to obtain the FDMA PPDU, the WLAN baseband chip is further described in this embodiment of this application, and a manner includes but is not limited to the following two cases:

In a first case, the WLAN baseband chip is further configured to perform OOK modulation, in response to a fact that to-be-modulated data corresponding to each WLAN device is a SYNC sequence, on a SYNC sequence corresponding to a target WLAN device and a subcarrier coefficient set corresponding to the target WLAN device in the subcarrier coefficient, to modulate the SYNC sequence to a subcarrier group of the corresponding WLAN device, to obtain the frequency-domain symbol sequence. The target WLAN device is any one of the n WLAN devices.

Alternatively, the WLAN baseband chip is configured to perform OOK modulation, in response to a fact that a SYNC sequence corresponding to a to-be-modulated data sequence is an HDR SYNC sequence, on first modulation data corresponding to a target WLAN device and a subcarrier coefficient set corresponding to the target WLAN device in the subcarrier coefficient, to modulate the first modulation data to a subcarrier group of the corresponding WLAN device to obtain the frequency-domain symbol sequence, where the first modulation data includes a SYNC sequence and/or a data sequence, and the data sequence is data other than a SYNC sequence in to-be-modulated data.

For example, that the WLAN baseband chip is configured to perform the OOK modulation on the SYNC sequence corresponding to the target WLAN device and the subcarrier coefficient set corresponding to the target WLAN device in the subcarrier coefficient may mean that the WLAN baseband chip is configured to multiply the SYNC sequence corresponding to the target WLAN device by the subcarrier coefficient set corresponding to the target WLAN device in the subcarrier coefficient. Similarly, that the WLAN baseband chip is configured to perform the OOK modulation on the first modulation data corresponding to the target WLAN device and the subcarrier coefficient set corresponding to the target WLAN device in the subcarrier coefficient may mean that the WLAN baseband chip is configured to multiply the first modulation data corresponding to the target WLAN device by the subcarrier coefficient set corresponding to the target WLAN device in the subcarrier coefficient.

It should be noted that that the WLAN baseband chip responds to a fact that the SYNC sequence corresponding to the to-be-modulated data sequence is the HDR SYNC sequence includes two cases: In a first case, the WLAN baseband chip currently modulates only a data sequence, and a SYNC sequence corresponding to the data sequence is HDR SYNC. In a second case, the WLAN baseband chip currently modulates a SYNC sequence and a data sequence, and a SYNC sequence corresponding to the to-be-modulated data sequence is an HDR SYNC sequence.

Optionally, the WLAN baseband chip is further configured to perform extension processing on the subcarrier coefficient, to obtain an extended subcarrier coefficient. The extended subcarrier coefficient includes a primary subcarrier coefficient and a secondary subcarrier coefficient, and the secondary subcarrier coefficient is determined based on the primary subcarrier coefficient.

Optionally, the extension processing includes duplicating processing, phase rotation processing, or the like. Correspondingly, the secondary subcarrier coefficient may be determined after the duplicating processing is performed on the primary subcarrier coefficient. Then, the secondary subcarrier coefficient is completely the same as the primary subcarrier coefficient. Alternatively, the secondary subcarrier coefficient may be determined after the phase rotation processing is performed on the primary subcarrier coefficient. Then, the secondary subcarrier coefficient is obtained by changing the primary subcarrier coefficient. For example, if a length of the primary subcarrier coefficient is 2 μs, correspondingly, a length of the secondary subcarrier coefficient is also 2 μs, and a length of the subcarrier coefficient formed by the primary subcarrier coefficient and the secondary subcarrier coefficient is 4 μs.

Further, the WLAN baseband chip is further configured to perform the OOK modulation, in response to a fact that the to-be-modulated data sequence includes a data sequence whose corresponding SYNC sequence is an LDR SYNC sequence, on the first modulation data corresponding to the target WLAN device and a subcarrier coefficient set corresponding to the target WLAN device in the extended subcarrier coefficient, to modulate the first modulation data to the subcarrier group of the corresponding WLAN device, to obtain the frequency-domain symbol sequence. The first modulation data includes a SYNC sequence and/or a data sequence.

For example, that the WLAN baseband chip performs the OOK modulation on the first modulation data corresponding to the target WLAN device and the subcarrier coefficient set corresponding to the target WLAN device in the extended subcarrier coefficient may mean that the WLAN baseband chip multiplies the first modulation data corresponding to the target WLAN device by the subcarrier coefficient set corresponding to the target WLAN device in the extended subcarrier coefficient.

It should be noted that that the to-be-modulated data sequence includes a data sequence whose corresponding SYNC sequence is an LDR SYNC sequence includes three cases: In a first case, the WLAN baseband chip currently modulates a SYNC sequence and a data sequence, and a SYNC sequence corresponding to the to-be-modulated data sequence includes an HDR SYNC sequence. In a second case, the WLAN baseband chip currently modulates only a data sequence, and a SYNC sequence corresponding to the data sequence includes an HDR SYNC sequence. In a third case, the WLAN baseband chip currently modulates only a data sequence, and a SYNC sequence corresponding to the data sequence is an HDR SYNC sequence.

Optionally, the WLAN baseband chip may be configured to process each symbol in the frequency-domain symbol sequence by using the IFFT circuit, to obtain each time-domain symbol.

Optionally, the time-domain symbol includes a first amount of sampling point data. The WLAN baseband chip is further configured to intercept a half of the time-domain symbol to obtain a short time-domain symbol. For example, intercepting the half of the time-domain symbol may be: intercepting the first half of sampling point data included in the time-domain symbol.

Further, the WLAN baseband chip is configured to obtain a second amount of sampling point data in the short time-domain symbol, and add the second amount of sampling point data to the short time-domain symbol, to obtain a time-domain symbol into which a GI has been inserted. The second amount of sampling point data is sampling point data in a tail part of the short time-domain symbol, and a value of the second amount is less than a value of the first amount. For example, the second amount of sampling point data may be added to the front of the short time-domain symbol.

For example, the first amount may be 256, and the second amount may be 32. When the first amount is 256 and the second amount is 32, the WLAN baseband chip is configured to intercept the first 128 pieces of sampling point data included in the time-domain symbol, to obtain a short time-domain symbol. 32 pieces of sampling point data in a tail part of the short time-domain symbol are obtained, and the 32 pieces of sampling point data are added to the front of the short time-domain symbol, to obtain a time-domain symbol into which a GI has been inserted.

The WLAN baseband chip is configured to perform windowing processing on the time-domain symbol into which the GI has been inserted, to obtain a time-domain symbol on which the windowing processing has been performed, and perform random processing on the time-domain symbol on which the windowing processing has been performed, to obtain a time-domain symbol on which the random processing has been performed. The random processing includes randomization processing and cyclic shift randomization processing.

The WLAN baseband chip is configured to perform CSD processing on the time-domain symbol on which the random processing has been performed, and obtain the FDMA PPDU based on the time-domain symbol on which the CSD processing has been performed. The WLAN baseband chip is configured to perform intermediate radio frequency processing on the time-domain symbol on which the CSD processing has been performed, to obtain the FDMA PPDU.

It should be noted that the WLAN baseband chip is further configured to insert a guard subcarrier into to-be-processed data. The to-be-processed data may be the frequency-domain symbol sequence, the time-domain symbol processed by the IFFT circuit, the short time-domain symbol, or the like.

In a second case, the WLAN baseband chip is configured to perform random processing on second modulation data, to obtain modulation data on which the random processing has been performed. The random processing includes randomization processing and cyclic shift randomization processing, and the second modulation data includes a SYNC sequence or a data sequence.

The WLAN baseband chip is configured to perform OOK modulation on the modulation data on which the random processing has been performed and the subcarrier coefficient, to modulate the modulation data on which the random processing has been performed to a subcarrier group of a corresponding WLAN device, to obtain the frequency-domain symbol sequence. Optionally, the WLAN baseband chip is configured to perform the OOK modulation on a subcarrier coefficient set corresponding to the target WLAN device and a CSD value to obtain the frequency-domain symbol sequence. The target WLAN device is any WLAN device in the n WLAN devices, and the CSD value Y meets:

$$Y=s_i m_i \exp(j2\Pi k\Delta_{F,WUR}(-T_{CSD}^{n_{tx}}-T_{CSR,i})),$$

where $s_i$ is an $i^{th}$ data value in to-be-modulated data corresponding to the target WLAN device, $m_i$ is a data value that is obtained after the random processing and that corresponds to an $i^{th}$ data value in the modulation data on which the random processing has been performed, k is a subcarrier sequence number, $\Delta_{F,WUR}$ is a subcarrier spacing value, $T_{CSD}^{n_{tx}}$ is a CSD value of an $n_{tx}^{th}$ antenna in the target WLAN device, and $T_{CSR,i}$ is a CSR value that corresponds to the target WLAN device and that is of an $i^{th}$ data value in the data sequence on which the duplicating processing has been performed.

For example, $\Delta_{F,WUR}$ generally is a constant. For example, $\Delta_{F,WUR}=312.5$ kHz. $T_{CSD}^{n_{tx}}$ and $T_{CSR,i}$ may be determined from an IEEE 802.11 communications standard.

Optionally, the WLAN baseband chip is further configured to perform extension processing on the subcarrier coefficient, to obtain an extended subcarrier coefficient. The extended subcarrier coefficient includes a primary subcarrier coefficient and a secondary subcarrier coefficient, and the secondary subcarrier coefficient is determined based on the primary subcarrier coefficient. The extension processing may include duplicating processing, phase rotation processing, or the like. Correspondingly, the secondary subcarrier coefficient may be determined after the duplicating processing is performed on the primary subcarrier coefficient, or the secondary subcarrier coefficient may be determined after the phase rotation processing is performed on the primary subcarrier coefficient. For example, if a length of the primary subcarrier coefficient is 2 µs, correspondingly, a length of the secondary subcarrier coefficient is also 2 µs, and a length of the subcarrier coefficient formed by the primary subcarrier coefficient and the secondary subcarrier coefficient is 4 µs.

Correspondingly, the WLAN baseband chip is configured to perform the OOK modulation on the modulation data on which the random processing has been performed and the extended subcarrier coefficient, to obtain the frequency-domain symbol sequence. Optionally, the WLAN baseband chip is configured to perform the OOK modulation on the extended subcarrier coefficient corresponding to the target WLAN device and a CSD value, to obtain the frequency-domain symbol sequence. The CSD value is the same as the foregoing CSD value. Details are not described in this embodiment of this application again.

For example, that the WLAN baseband chip is configured to perform the OOK modulation on the extended subcarrier coefficient corresponding to the target WLAN device and the CSD value may mean that the WLAN baseband chip is configured to multiply the extended subcarrier coefficient corresponding to the target WLAN device by the CSD value.

Optionally, the WLAN baseband chip may be configured to process each symbol in the frequency-domain symbol sequence by using the IFFT circuit, to obtain each time-domain symbol.

Optionally, the time-domain symbol includes a first amount of sampling point data. The WLAN baseband chip is further configured to intercept a half of the time-domain symbol to obtain a short time-domain symbol. For example, intercepting the half of the time-domain symbol may be: intercepting the first half of sampling point data included in the time-domain symbol.

Further, optionally, the WLAN baseband chip is configured to obtain a second amount of sampling point data in the short time-domain symbol, and add the second amount of sampling point data to the short time-domain symbol, to obtain a time-domain symbol into which a GI has been inserted. The second amount of sampling point data is sampling point data in a tail part of the short time-domain symbol, and a value of the second amount is less than a value of the first amount.

For example, the first amount may be 256, and the second amount may be 32. When the first amount is 256 and the second amount is 32, the WLAN baseband chip is configured to intercept the first 128 pieces of sampling point data included in the time-domain symbol, to obtain a short time-domain symbol. 32 pieces of sampling point data in a tail part of the short time-domain symbol are obtained, and the 32 pieces of sampling point data are added to the front of the short time-domain symbol, to obtain a time-domain symbol into which a GI has been inserted.

The WLAN baseband chip is configured to perform windowing processing on the time-domain symbol into which the GI has been inserted, and obtain the FDMA PPDU based on the time-domain symbol on which the windowing processing has been performed. The WLAN baseband chip is configured to perform intermediate radio frequency processing on the time-domain symbol on which the windowing processing has been performed, to obtain the FDMA PPDU.

It should be noted that the WLAN baseband chip is further configured to insert a guard subcarrier into to-be-processed data. The to-be-processed data may be the frequency-domain symbol sequence, the time-domain symbol processed by the IFFT circuit, the short time-domain symbol, or the like. In other words, the guard subcarrier may be inserted into the frequency-domain symbol sequence, or the guard subcarrier may be inserted into the time-domain symbol processed by the IFFT circuit, or the guard subcarrier may be inserted into the short time-domain symbol.

In this embodiment of this application, compared with the WLAN baseband chip in the first case, for the WLAN baseband chip in the second case, processing implemented in time domain in the FDMA PPDU generation process can be further reduced (in other words, operations on data obtained after IFFT can be reduced), to further implement processing in frequency domain, and ensure "normalization" processing in time domain, to implement compatibility with a communications standard supporting frequency-domain processing, namely, compatibility with a physical layer (PHY) link supporting a communications standard such as IEEE 802.11ac/ax.

To sum up, in the FDMA PPDU generation process, the WLAN baseband chip provided in this embodiment of this application modulates data of the plurality of WLAN devices to carriers before IFFT (namely, in frequency domain). Therefore, a WLAN chip is modified slightly, and costs of a WLAN baseband chip supporting sending of a WUR frame of an FDMA PPDU are reduced. Because a length of a time-domain symbol of an LDR data part is twice a length of a time-domain symbol of an HDR data part, direct modulation leads to a result that time-domain symbols having different lengths cannot be obtained through IFFT. Therefore, each bit in the LDR data part is modulated twice by using a short time-domain symbol as a reference. In this way, LDR data of two same short time-domain symbols forms one long time-domain symbol, to implement compatibility with two types of symbols.

Figure 5:
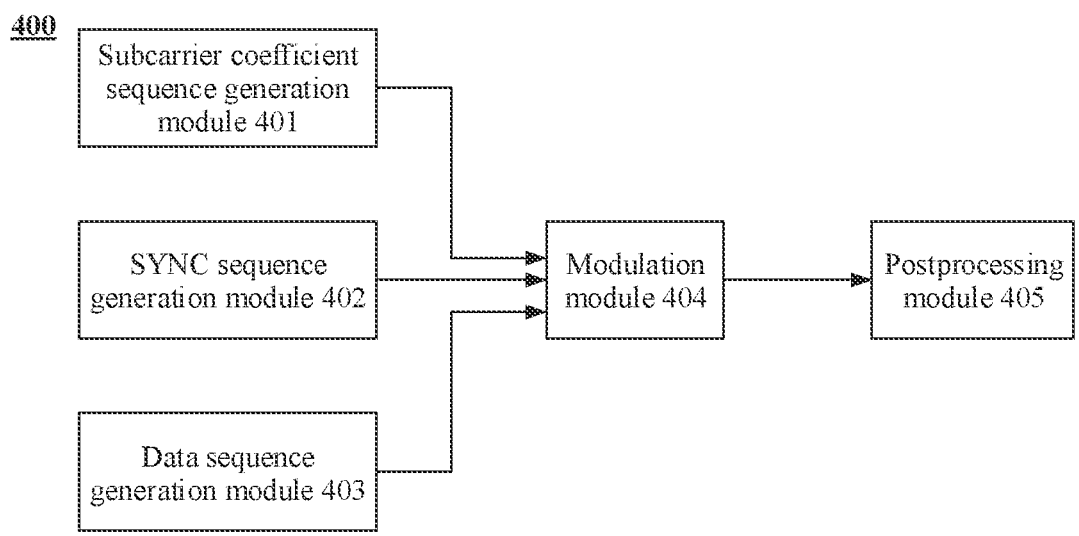
FIG. 5 is a schematic structural diagram of a WLAN baseband chip according to an embodiment of this application.
Figure 6:
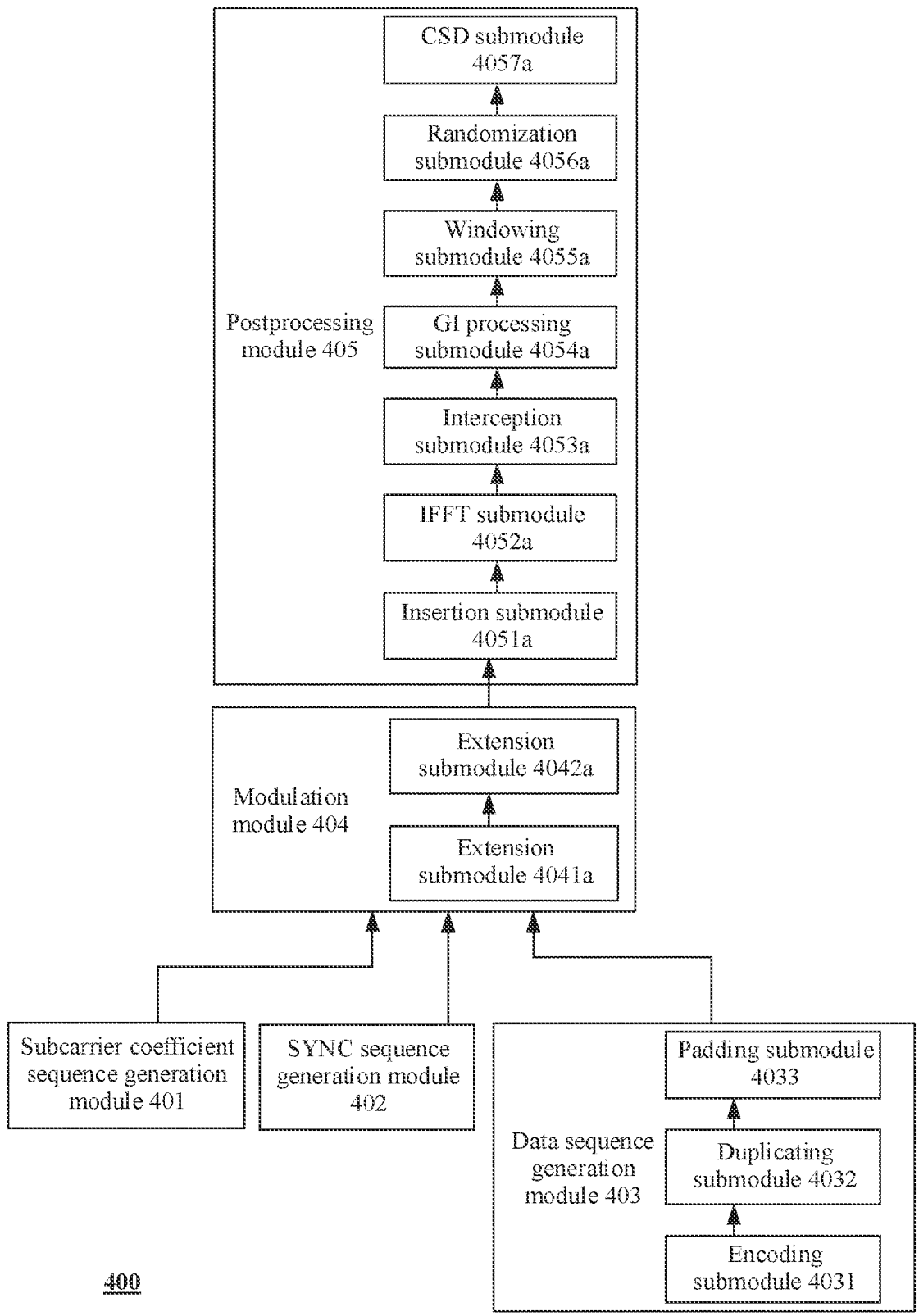
FIG. 6 is a schematic structural diagram of another WLAN baseband chip according to an embodiment of this application.
Figure 7:
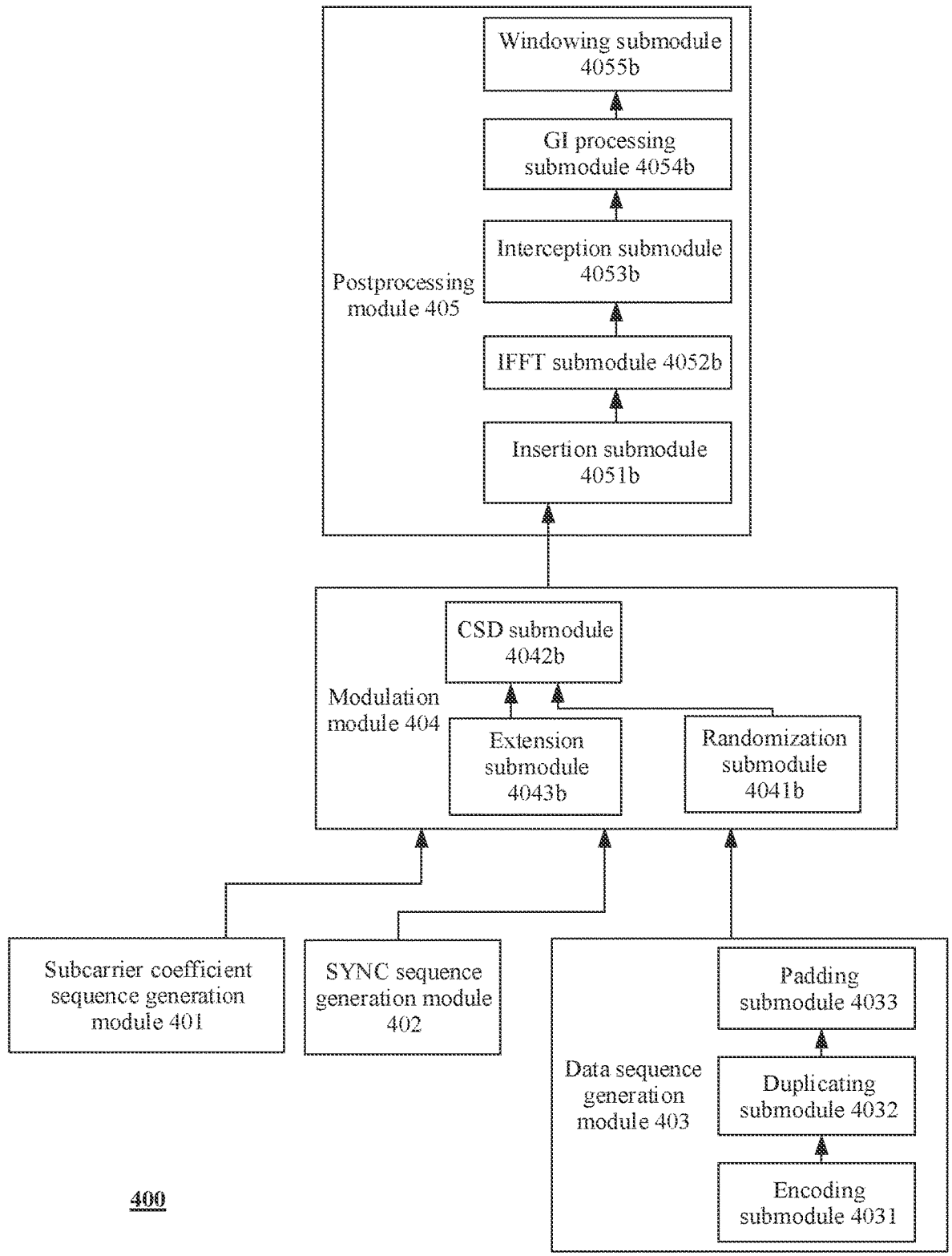
FIG. 7 is a schematic structural diagram of still another WLAN baseband chip according to an embodiment of this application.

An embodiment of this application provides a WLAN baseband chip. Referring to FIG. 5, FIG. 6, and FIG. 7, the WLAN baseband chip 400 includes: a subcarrier coefficient sequence generation module 401, a SYNC sequence generation module 402, a data sequence generation module 403, a modulation module 404, and a postprocessing module 405. All of the subcarrier coefficient sequence generation module 401, the SYNC sequence generation module 402, and the data sequence generation module 403 are connected to the modulation module 404, and the modulation module 404 is connected to the postprocessing module 405.

The subcarrier coefficient sequence generation module 401 is configured to obtain a subcarrier coefficient sequence from a memory of the WLAN baseband chip, obtain, based on the subcarrier coefficient sequence, a subcarrier coefficient corresponding to a subcarrier set, and transmit the subcarrier coefficient to the postprocessing module 404. The subcarrier set includes n subcarrier groups, any subcarrier group includes a plurality of continuous subcarriers, any two subcarrier groups are discontinuous, all subcarriers in the subcarrier set are in one frequency band, n is an integer greater than or equal to 2, and the n subcarrier groups correspond to n WLAN devices. For example, a length of the subcarrier coefficient may be 2 μs, and the subcarrier coefficient may also be referred to as an On-WG symbol.

Optionally, the memory of the WLAN baseband chip directly stores the subcarrier coefficient corresponding to the subcarrier set. The subcarrier coefficient sequence generation module 401 may directly obtain the subcarrier coefficient from the memory based on the subcarrier coefficient sequence. Alternatively, the subcarrier coefficient sequence generation module 401 obtains the subcarrier coefficient sequence, and maps the subcarrier coefficient sequence onto n subcarrier groups of a particular frequency band, to obtain the subcarrier coefficient corresponding to the subcarrier set.

The SYNC sequence generation module 402 is configured to obtain n SYNC sequences of the n WLAN devices based on SYNC sequences stored in the memory, and transmit the n SYNC sequences to the modulation module 404. Each SYNC sequence corresponds to one WLAN device, the n SYNC sequences include m LDR SYNC sequences and n−m HDR SYNC sequences, and m is a positive integer less than or equal to n. An FDMA PPDU includes n sub PPDUs corresponding to the n WLAN devices, and each sub PPDU includes a SYNC sequence.

The data sequence generation module 403 is configured to obtain n data streams corresponding to the n WLAN devices, and perform duplicating processing on m data streams in the n data streams to obtain m data sequences on which the duplicating processing has been performed and n−m remaining data streams, and the data sequence generation module 403 transmits the m data sequences on which the duplicating processing has been performed and the n−m remaining data streams to the postprocessing module 404. The duplicating processing includes: duplicating, once, each bit in a data stream on which the duplicating processing is to be performed, and inserting the duplicate bit beside the duplicated bit.

The modulation module 404 is configured to sequentially and respectively modulate bits in the n pieces of to-be-modulated data to the n subcarrier groups of the corresponding WLAN devices based on the subcarrier coefficient, to obtain a frequency-domain symbol sequence, and transmit the frequency-domain symbol sequence to the postprocessing module 405. The n pieces of to-be-modulated data include m pieces of to-be-modulated data and n−m pieces of to-be-modulated data, the m pieces of to-be-modulated data are obtained based on the m LDR SYNC sequences and the m data sequences on which the duplicating processing has been performed, and the n−m pieces of to-be-modulated data are obtained based on the n−m HDR SYNC sequences and the n−m remaining data streams.

The postprocessing module 405 is configured to perform postprocessing on the frequency-domain symbol sequence to obtain an FDMA PPDU. The postprocessing includes: processing each symbol in the frequency-domain symbol sequence by using an IFFT circuit to obtain each time-domain symbol.

The modulation module 404 and the postprocessing module 405 may be two independent modules, or may be integrated into one module. When the modulation module 404 and the postprocessing module 405 are integrated into one module, the module is configured to perform postprocessing on the n pieces of to-be-modulated data to obtain the FDMA PPDU. The postprocessing includes: sequentially and respectively modulating the bits in the n pieces of to-be-modulated data to the n subcarrier groups of the corresponding WLAN devices based on the subcarrier coefficient to obtain the frequency-domain symbol sequence, and processing each symbol in the frequency-domain symbol sequence by using the IFFT circuit, to obtain each time-domain symbol. In this embodiment of this application, description is provided by using an example in which the modulation module 404 and the postprocessing module 405 are two independent modules.

The foregoing modules in this embodiment of this application are further described below, and are illustrated as follows:

Optionally, every two non-zero coefficients in the subcarrier coefficient sequence obtained by the subcarrier coefficient sequence generation module 401 are spaced by at least one zero coefficient. For example, the subcarrier coefficient sequence includes p subcarrier coefficients, p is an odd number, values of a $2j^{th}$ subcarrier coefficient and a center subcarrier coefficient are zero, a value of a $(2j+1)^{th}$ subcarrier coefficient other than the center subcarrier coefficient is a non-zero value, j<p, and both j and p are positive integers.

That the subcarrier coefficient sequence generation module 401 may be configured to obtain, based on the subcarrier coefficient sequence in the memory, the subcarrier coefficient corresponding to the subcarrier set may include two cases. In a first case, the memory of the WLAN baseband chip directly stores the subcarrier coefficient corresponding to the subcarrier set. In a second case, the WLAN baseband chip maps the subcarrier coefficient sequence onto the n continuous subcarrier groups of the particular frequency band, to obtain the subcarrier coefficient corresponding to the subcarrier set.

Optionally, the data sequence generation module 403 may include an encoding submodule 4031, a duplicating submodule 4032, and a padding submodule 4033. The duplicating submodule 4032 is separately connected to the encoding submodule 4031 and the padding submodule 4033, and the padding submodule 4033 is connected to the modulation module 404.

The encoding submodule 4031 is configured to perform WUR encoding processing on n to-be-sent data streams of the WLAN devices to obtain n encoded data streams, and transmit the n encoded data streams to the duplicating submodule 4032.

The duplicating submodule 4032 is configured to perform duplicating processing on m encoded data streams in the n encoded data streams to obtain m data sequences on which the duplicating processing has been performed and n−m remaining data streams, transmit the m data sequences on which the duplicating processing has been performed and the n−m remaining data streams to the padding submodule 4033. The duplicating processing includes: duplicating, once, each bit in a data stream on which the duplicating processing is to be performed, and inserting the duplicate bit beside the duplicated bit.

The padding submodule 4033 is configured to perform padding processing, in response to a fact that a data amount of any piece of to-be-modulated data in the n pieces of to-be-modulated data is not equal to a data amount of other to-be-modulated data, and on to-be-padded to-be-modulated data in the n pieces of to-be-modulated data, to obtain to-be-modulated data on which the padding processing has been performed, to obtain n pieces of to-be-modulated data having a same data amount. The data amount of the to-be-padded to-be-modulated data is less than a data amount of target to-be-modulated data, and the target to-be-modulated data is to-be-modulated data having a largest data amount in the n pieces of to-be-modulated data. The to-be-modulated data on which the padding processing has been performed includes a SYNC sequence and a data sequence, and the data sequence includes a data sequence on which the duplicating processing has been performed/a data stream and a padding sequence (which forms the foregoing padding field). A value of each piece of data in the padding sequence is a reference value. For example, the reference value may be 1. A quantity of the reference values (namely, a size of the padding sequence) may be delivered by an upper-layer protocol.

It should be noted that connection locations of the duplicating submodule 4032 and the padding submodule 4033 in the data sequence generation module 403 may be exchanged. In other words, the padding submodule 4033 is separately connected to the duplicating submodule 4032 and the encoding submodule 4031. Correspondingly, the encoding submodule 4031 is configured to transmit the encoded data stream to the padding submodule 4033. The padding submodule 4033 is configured to perform the padding processing on the encoded data stream, to obtain a padded data sequence. The duplicating submodule 4032 is configured to perform spaced duplicating processing on all or some bits in the padded data sequence to obtain the to-be-modulated data.

The modulation module 404 and the postprocessing module 405 are described. The following two cases are included without limitation:

In a first case, as shown in FIG. 6, the modulation module 404 is configured to perform the following operations.

The modulation module 404 is configured to perform OOK modulation, in response to a fact that data corresponding to each WLAN device is a SYNC sequence, on a SYNC sequence corresponding to a target WLAN device and a subcarrier coefficient set corresponding to the target WLAN device in the subcarrier coefficient, to modulate the SYNC sequence to a subcarrier group of the corresponding WLAN device, to obtain the frequency-domain symbol sequence. The target WLAN device is any one of the n WLAN devices.

Alternatively, the modulation module 404 is configured to perform OOK modulation, in response to a fact that a SYNC sequence corresponding to a to-be-modulated data sequence is an HDR SYNC sequence, on first modulation data corresponding to a target WLAN device and a subcarrier coefficient set corresponding to the target WLAN device in the subcarrier coefficient, to modulate the first modulation data to a subcarrier group of the corresponding WLAN device to obtain the frequency-domain symbol sequence, where the first modulation data includes a SYNC sequence and/or a data sequence, and the data sequence is data other than a SYNC sequence in to-be-modulated data.

It should be noted that when a mode of a sub PPDU corresponding to the data sequence modulated by the modulation module 404 is an HDR mode, the WLAN baseband chip responds to a fact that the mode of the sub PPDU corresponding to the to-be-modulated data sequence is the HDR mode. Correspondingly, data modulated by the modulation module 404 also includes two cases. In a first case, only a data sequence is modulated currently, and a SYNC sequence corresponding to the data sequence is HDR SYNC. In a second case, a SYNC sequence and a data sequence are modulated currently, and a SYNC sequence corresponding to the to-be-modulated data sequence is an HDR SYNC sequence.

Optionally, the modulation module 404 may include an extension submodule 4041a and a modulation submodule 4042a. The extension submodule 4042a is separately connected to the subcarrier coefficient sequence generation module 401 and the modulation submodule 4042a, and the modulation submodule 4042a is connected to the postprocessing module 405.

The extension submodule 4041a is configured to perform extension processing on the received subcarrier coefficient to obtain an extended subcarrier coefficient. The extended subcarrier coefficient includes a primary subcarrier coefficient and a secondary subcarrier coefficient, and the secondary subcarrier coefficient is determined based on the primary subcarrier coefficient.

The modulation submodule 4042a is configured to perform, in response to a fact that a SYNC sequence corresponding to a to-be-modulated data sequence is an LDR SYNC sequence, and the OOK modulation on the first modulation data corresponding to the target WLAN device and a subcarrier coefficient set corresponding to the target WLAN device in the extended subcarrier coefficient, to modulate the first modulation data to the subcarrier group of the corresponding WLAN device, to obtain the frequency-domain symbol sequence. The first modulation data includes a SYNC sequence and/or a data sequence.

It should be noted that that there is a sub PPDU in an LDR mode in sub PPDUs corresponding to the to-be-modulated data sequence includes three cases. In a first case, the WLAN baseband chip currently modulates a SYNC sequence and a data sequence, and a SYNC sequence corresponding to the to-be-modulated data sequence includes an HDR SYNC sequence. In a second case, the WLAN baseband chip currently modulates only a data sequence, and a SYNC sequence corresponding to the data sequence includes an HDR SYNC sequence. In a third case, the WLAN baseband chip currently modulates only a data sequence, and a SYNC sequence corresponding to the data sequence is an HDR SYNC sequence.

Optionally, the postprocessing module 405 may include: an insertion submodule 4051a, an IFFT submodule 4052a, an interception submodule 4053a, a guard interval (GI) processing submodule 4054a, a windowing submodule 4055a, a randomization submodule 4056a, and a cyclic shift diversity (CSD) submodule 4057a. The insertion submodule 4051a, the IFFT submodule 4052a, the interception submodule 4053a, the GI processing submodule 4054a, the windowing submodule 4055a, the randomization submodule 4056a, and the CSD submodule 4057a are sequentially connected, and the insertion submodule 4051a is connected to the modulation module 404.

The insertion submodule 4051a is configured to insert a guard subcarrier into the received frequency-domain symbol sequence to obtain a second intermediate symbol into which the guard subcarrier has been inserted, and transmit the second intermediate symbol to the IFFT submodule 4052a.

Optionally, the insertion submodule 4051a is configured to insert guard subcarriers into two ends of the received frequency-domain symbol sequence to obtain a second intermediate symbol into which the guard subcarriers have been inserted, and transmit the second intermediate symbol to the IFFT submodule 4052a.

The IFFT submodule (namely, an IFFT circuit) 4052a is configured to perform IFFT processing on the received second intermediate symbol to obtain a time-domain symbol on which the IFFT processing has been performed, and transmit the time-domain symbol on which the IFFT has been performed to the interception submodule 4053a. The time-domain symbol on which the IFFT has been performed includes a first amount of sampling point data.

The interception submodule 4053a is configured to intercept a half of the received time-domain symbol on which the IFFT has been performed, to obtain a short time-domain symbol, and transmit the short time-domain symbol to the GI processing submodule 4054a. For example, intercepting the half of the time-domain symbol may be: intercepting the first half of sampling point data included in the time-domain symbol.

The GI processing submodule 4053a is configured to obtain a second amount of sampling point data in the received short time-domain symbol, add the second amount of sampling point data to the short time-domain symbol to obtain a time-domain symbol into which a GI has been inserted, and transmit the time-domain symbol into which the GI has been inserted to the windowing submodule 4054a. The second amount of sampling point data is sampling point data in a tail part of the short time-domain symbol, and a value of the second amount is less than a value of the first amount.

The windowing submodule 4054a is configured to perform windowing processing on the received time-domain symbol into which the GI has been inserted, to obtain a time-domain symbol on which the windowing processing has been performed, and transmit the time-domain symbol on which the windowing processing has been performed to the randomization submodule 4055a.

The randomization submodule 4055a is configured to perform random processing on the received time-domain symbol on which the windowing processing has been performed, to obtain a time-domain symbol on which the random processing has been performed, and transmit the time-domain symbol on which the random processing has been performed to the CSD submodule 4056a. The random processing includes randomization processing and CSR processing.

The CSD submodule 4054a is configured to perform CSD processing on the received time-domain symbol on which the random processing has been performed, and obtain the FDMA PPDU based on a time-domain symbol on which the CSD processing has been performed. The CSD submodule 4054a is configured to perform intermediate radio frequency processing on the time-domain symbol on which the CSD processing has been performed, to obtain the FDMA PPDU.

In this embodiment of this application, in the WLAN baseband chip shown in FIG. 6, the subcarrier coefficient sequence generation module 401 generates the subcarrier coefficients corresponding to the n WLAN devices. The SYNC sequence generation module 402 generates the SYNC sequence of each sub PPDU corresponding to each WLAN device. The data sequence generation module 403 generates the data sequence of each sub PPDU. The modulation module 404 modulates the subcarrier coefficient and at least one of the SYNC sequence and the data sequence, to generate the intermediate symbol. The postprocessing module 405 generates the FDMA PPDU based on the intermediate symbol. Therefore, the WLAN baseband chip in the WLAN device separately performs processing for different WLAN devices in frequency domain in the FDMA PPDU generation process. Therefore, the WLAN device is compatible with communications standards (for example, IEEE 802.11ac and IEEE 802.11ax) supporting an operation of "distinguishing" between a plurality of users in frequency domain, and costs of a WLAN device supporting sending of an FDMA PPDU are reduced.

It should be noted that in the WLAN baseband chip shown in FIG. 6, the modules may be further separated or integrated. In this embodiment of this application, the following two implementations are used as an example for description.

In a first implementation, the extension submodule 4041a may be combined with the subcarrier coefficient sequence generation module 401. To be specific, the subcarrier coefficient sequence generation module 401 not only is configured to generate one subcarrier coefficient corresponding to the n WLAN devices, and transmit the one subcarrier coefficient to the modulation module, but also is configured to: when the modulation submodule responds to a fact that there is an LDR SYNC sequence in a SYNC sequence corresponding to a to-be-modulated data sequence, perform extension processing on the generated subcarrier coefficient corresponding to the n WLAN devices, to obtain an extended subcarrier coefficient. The extended subcarrier coefficient includes a primary subcarrier coefficient and a secondary subcarrier coefficient, and the secondary subcarrier coefficient is determined based on the primary subcarrier coefficient.

In this case, regardless of whether data modulated by the modulation module 404 is a SYNC sequence, a data sequence corresponding to an HDR SYNC sequence, or a data sequence corresponding to an LDR SYNC sequence, the modulation module 404 may be configured to perform OOK modulation on a subcarrier coefficient set corresponding to a target WLAN device in the subcarrier coefficient transmitted by the subcarrier coefficient sequence generation module 401 or the extended subcarrier coefficient and to-be-modulated data corresponding to a target WLAN device. In this way, compared with a modulation module 404 of a WLAN device in a related technology, the modulation module 404 of the WLAN device provided in this embodiment of this application does not need to be modified, thereby reducing manufacturing costs of the WLAN device.

In a second implementation, the duplicating submodule 4032 and the padding submodule 4033 that are included in the data sequence generation module 403 may be combined with the modulation module 404. In other words, the data sequence generation module 403 has only a function of the encoding submodule 4031. To be specific, the data sequence generation module 403 is configured to perform WUR encoding processing on the n data streams to obtain n encoded data streams, and transmit the n encoded data streams to the modulation module. The modulation module 404 is configured to perform duplicating processing on m encoded data streams in the received n encoded data streams to obtain m data sequences on which the duplicating processing has been performed and n−m remaining data streams. Alternatively, the modulation module 404 is further configured to perform padding processing, in response to a fact that a data amount of any piece of to-be-modulated data in the n pieces of to-be-modulated data is not equal to a data amount of other to-be-modulated data, on to-be-padded to-be-modulated data in the n pieces of to-be-modulated data, to obtain to-be-modulated data on which the padding processing has been performed, to obtain n pieces of to-be-modulated data having a same data amount. In this way, compared with a data sequence generation module 403 of the WLAN device in the related technology, the data sequence generation module of the WLAN device provided in this embodiment of this application does not need to be modified, thereby reducing manufacturing costs of the WLAN device.

It should be noted that connection manners of the modules in the modulation module 404 and the postprocessing module 405 may be further changed, and functions of the modules may also be correspondingly adjusted. This is not limited in this embodiment of this application.

In a second case, as shown in FIG. 7, optionally, the modulation module 404 may include a randomization submodule 4041b and a CSD submodule 4042b. The randomization submodule 4041b is separately connected to the SYNC sequence generation module 402, the data sequence generation module 403, and the CSD submodule 4042b, and the CSD submodule 4042b is separately connected to the subcarrier coefficient sequence generation module 401 and the postprocessing module 405.

The randomization submodule 4041b is configured to perform random processing on second modulation data to obtain modulation data on which the random processing has been performed, and transmit the modulation data on which the random processing has been performed to the CSD submodule 4042b. The random processing includes randomization processing and cyclic shift randomization processing, and the second modulation data includes a SYNC sequence or a data sequence.

The CSD submodule 4042b is configured to perform CSD processing on the received modulation data on which the random processing has been performed and the subcarrier coefficient to obtain the subcarrier coefficient sequence, and transmit the subcarrier coefficient sequence to the postprocessing module 405.

Optionally, the CSD submodule 4042b is configured to multiply a subcarrier coefficient corresponding to a target WLAN device by a CSD value to obtain the frequency-domain symbol sequence. The target WLAN device is any WLAN device in the n WLAN devices, and the CSD value Y meets:

$$Y = s_i m_i \exp(j2\Pi k \Delta_{F,WUR}(-T_{CSD}^{n_{tx}} - T_{CSR,i})),$$

where $s_i$ is an $i^{th}$ data value in to-be-modulated data corresponding to the target WLAN device, $m_i$ is a data value that is obtained after the random processing and that corresponds to an $i^{th}$ data value in the modulation data on which the random processing has been performed and that is output by the randomization submodule, k is a subcarrier sequence number, $\Delta_{F,WUR}$ is a subcarrier spacing value, $T_{CSD}^{n_{tx}}$ is a CSD value of an $n_{tx}^{th}$ antenna in the target WLAN device, and $T_{CSR,i}$ is a CSR value that corresponds to the target WLAN device and that is of an $i^{th}$ data value in the data sequence on which the duplicating processing has been performed.

Optionally, the modulation module 404 further includes an extension submodule 4043b. The extension submodule 4043b is separately connected to the subcarrier coefficient sequence generation module 401 and the CSD submodule 4042b.

The extension submodule 4043b is configured to perform extension processing on the received subcarrier coefficient to obtain an extended subcarrier coefficient, and transmit the extended subcarrier coefficient to the CSD submodule 4042b. The extended subcarrier coefficient includes a primary subcarrier coefficient and a secondary subcarrier coefficient, and the secondary subcarrier coefficient is determined based on the n primary subcarrier coefficients. Optionally, the extension processing includes duplicating processing, phase rotation processing, or the like. Correspondingly, the secondary subcarrier coefficient may be determined after the duplicating processing is performed on the primary subcarrier coefficient, or the secondary subcarrier coefficient may be determined after the phase rotation processing is performed on the primary subcarrier coefficient. For example, if a length of the primary subcarrier coefficient is 2 µs, correspondingly, a length of the secondary subcarrier coefficient is also 2 µs, and a length of the subcarrier coefficient formed by the primary subcarrier coefficient and the secondary subcarrier coefficient is 4 µs.

Correspondingly, the CSD submodule 4042b is configured to perform CSD processing on the received modulation data on which the random processing has been performed and the received extended subcarrier coefficient to obtain the frequency-domain symbol sequence, and transmit the frequency-domain symbol sequence to the postprocessing module 405.

Optionally, the CSD submodule 4042b is configured to multiply the extended subcarrier coefficient corresponding to the target WLAN device by the CSD value to obtain the frequency-domain symbol sequence, where the CSD value is the same as the foregoing CSD value.

In this embodiment of this application, the postprocessing module 405 may include an insertion submodule 4051*b*, an IFFT submodule 4052*b*, an interception submodule 4053*b*, a GI processing submodule 4054*b*, and a windowing submodule 4055*b*. The insertion submodule 4051*b*, the IFFT submodule 4052*b*, the interception submodule 4053*b*, the GI processing submodule 4054*b*, and the windowing submodule 4055*b* are sequentially connected, and the insertion submodule 4051*b* is connected to the modulation module 404.

The insertion submodule 4051*b* is configured to insert a guard subcarrier into the received subcarrier coefficient sequence to obtain a second intermediate symbol into which the guard subcarrier has been inserted, and transmit the second intermediate symbol to the IFFT submodule 4052*b*.

The IFFT submodule (namely, an IFFT circuit) 4052*b* is configured to perform IFFT processing on the received second intermediate symbol to obtain a time-domain symbol on which the IFFT processing has been performed, and transmit the time-domain symbol to the interception submodule 4053*a*. The time-domain symbol includes a first amount of sampling point data.

The interception submodule 4053*b* is configured to intercept a half of the received time-domain symbol on which the IFFT has been performed, to obtain a short time-domain symbol, and transmit the short time-domain symbol to the GI processing submodule 4054*b*. For example, intercepting the half of the time-domain symbol may be: intercepting the first half of sampling point data included in the time-domain symbol.

The GI processing submodule 4054*b* is configured to obtain a second amount of sampling point data in the received short time-domain symbol, add the second amount of sampling point data to the front of the short time-domain symbol to obtain a time-domain symbol into which a GI has been inserted, and transmit the time-domain symbol into which the GI has been inserted to the windowing submodule 4055*b*. The second amount of sampling point data is sampling point data in a tail part of the short time-domain symbol, and a value of the second amount is less than a value of the first amount.

The windowing submodule 4055*b* is configured to perform windowing processing on the received time-domain symbol into which the GI has been inserted, and obtain the FDMA PPDU based on the time-domain symbol on which the windowing processing has been performed. The windowing submodule 4055*b* is configured to perform intermediate radio frequency processing on the time-domain symbol on which the windowing processing has been performed, to obtain the FDMA PPDU.

In this embodiment of this application, compared with the WLAN baseband chip shown in FIG. 6, for the WLAN baseband chip shown in FIG. 7, processing implemented in time domain in the FDMA PPDU generation process can be further reduced (in other words, operations on data obtained after IFFT can be reduced), to further implement processing in frequency domain, and ensure "normalization" processing in time domain, to implement compatibility with a communications standard supporting frequency-domain processing, namely, compatibility with a physical layer (PHY) link supporting a communications standard such as IEEE 802.11ac/ax.

To sum up, in the FDMA PPDU generation process, the WLAN baseband chip provided in this embodiment of this application modulates data of the plurality of WLAN devices to carriers before IFFT (namely, in frequency domain). Therefore, a WLAN chip is modified slightly, and costs of a WLAN baseband chip supporting sending of a WUR frame of an FDMA PPDU are reduced. Because a length of a time-domain symbol of an LDR data part is twice a length of a time-domain symbol of an HDR data part, direct modulation leads to a result that time-domain symbols having different lengths cannot be obtained through IFFT. Therefore, each bit in the LDR data part is modulated twice by using a short time-domain symbol as a reference. In this way, LDR data of two same short time-domain symbols forms one long time-domain symbol, to implement compatibility with two types of symbols.

Figure 8:
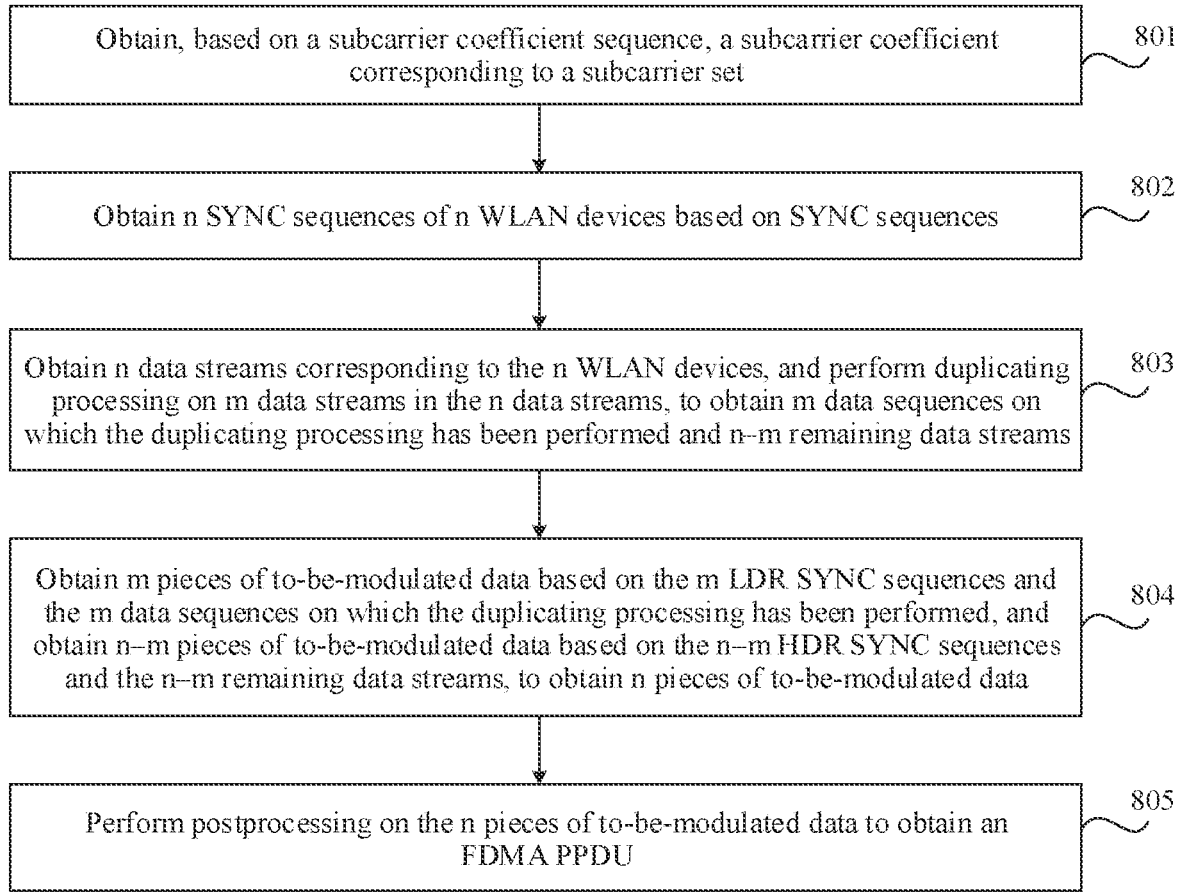
FIG. 8 is a schematic flowchart of an FDMA PPDU generation method according to an embodiment of this application.

FIG. 8 is a schematic flowchart of an FDMA PPDU generation method according to an embodiment of this application. The method may be applied to the WLAN baseband chip shown in FIG. 5, FIG. 6, or FIG. 7. As shown in FIG. 8, the method includes the following steps.

Step 801: Obtain, based on a subcarrier coefficient sequence, a subcarrier coefficient corresponding to a subcarrier set.

The subcarrier set includes n subcarrier groups, any subcarrier group includes a plurality of continuous subcarriers, any two subcarrier groups are discontinuous, all subcarriers in the subcarrier set are in one frequency band, n is an integer greater than or equal to 2, and the n subcarrier groups correspond to n WLAN devices.

Optionally, the subcarrier coefficient sequence may be directly stored in a memory of the WLAN baseband chip, and then, the WLAN baseband chip may directly obtain the subcarrier coefficient sequence from the memory of the WLAN baseband chip, to obtain the subcarrier coefficient based on the subcarrier coefficient sequence. The subcarrier coefficient sequence includes m subcarrier coefficients. When m is an odd number, values of a $2j^{th}$ subcarrier coefficient and a center subcarrier coefficient are zero, a value of a $(2j+1)^{th}$ subcarrier coefficient other than the center subcarrier coefficient is a non-zero value, j<m, and both j and m are positive integers. For example, a length of the subcarrier coefficient may be 2 μs.

Step 802: Obtain n SYNC sequences of n WLAN devices based on SYNC sequences.

Each SYNC sequence corresponds to one WLAN device, the n SYNC sequences include m LDR SYNC sequences and n–m HDR SYNC sequences, and m is a positive integer less than or equal to n. One FDMA PPDU may include a plurality of sub PPDUs, and each sub PPDU corresponds to one WLAN device.

Optionally, the WLAN baseband chip may generate, based on synchronization information between the WLAN baseband chip and each WLAN device, a SYNC sequence in a sub PPDU corresponding to the WLAN device. A length of the SYNC sequence may be determined based on an HDR mode flag and an LDR mode flag that are delivered by MAC. When a mode flag delivered by the MAC is an LDR mode flag, in other words, when the sub PPDU is configured to be a sub PPDU in an LDR mode, the SYNC sequence in the sub PPDU is an LDR SYNC sequence, and a length of the LDR SYNC sequence is 64 bits. When a mode flag delivered by the MAC is an HDR mode flag, and the sub PPDU is configured to be a sub PPDU in an HDR mode, the SYNC sequence in the sub PPDU is an HDR SYNC sequence, and a length of the HDR SYNC sequence is 32 bits.

Step 803. Obtain n data streams corresponding to the n WLAN devices, and perform duplicating processing on m data streams in the n data streams, to obtain m data sequences on which the duplicating processing has been performed and n–m remaining data streams.

The duplicating processing includes: duplicating, once, each bit in a data stream on which the duplicating processing is to be performed, and inserting the duplicate bit beside the duplicated bit. When m=n, the WLAN baseband chip is configured to perform the duplicating processing on each of the n data streams to obtain n data sequences on which the duplicating processing has been performed.

Optionally, the n data streams obtained by the WLAN baseband chip may be data streams on which WUR encoding processing has been performed.

Step 804. Obtain m pieces of to-be-modulated data based on the m LDR SYNC sequences and the m data sequences on which the duplicating processing has been performed, and obtain n−m pieces of to-be-modulated data based on the n−m HDR SYNC sequences and the n−m remaining data streams, to obtain n pieces of to-be-modulated data.

When m=n, n−m=0. Therefore, the WLAN baseband chip cannot obtain n−m pieces of modulation data. It may be considered that the WLAN baseband chip does not perform the step of obtaining the n−m pieces of to-be-modulated data based on the n−m HDR SYNC sequences and the n−m remaining data streams.

In this embodiment of this application, after or before the WLAN baseband chip performs step 804, the WLAN baseband chip may perform padding processing, in response to a fact that a data amount of any piece of to-be-modulated data in the n pieces of to-be-modulated data is not equal to a data amount of other to-be-modulated data, on to-be-padded to-be-modulated data in the n pieces of to-be-modulated data, to obtain to-be-modulated data on which the padding processing has been performed, to obtain n pieces of to-be-modulated data having a same data amount. A data amount of the to-be-padded to-be-modulated data is less than a data amount of target to-be-modulated data, and the target to-be-modulated data is to-be-modulated data having a largest data amount in the n pieces of to-be-modulated data. The to-be-modulated data on which the padding processing has been performed includes a padding sequence (which forms the foregoing padding field). A value of each piece of data in the padding sequence is a reference value. For example, the reference value may be 1. A quantity of the reference values (namely, a size of the padding sequence) may be delivered by an upper-layer protocol.

Step 805: Perform postprocessing on the n pieces of to-be-modulated data to obtain an FDMA PPDU.

The postprocessing includes: sequentially and respectively modulating bits in the n pieces of to-be-modulated data to the n subcarrier groups of the corresponding WLAN devices based on the subcarrier coefficient to obtain a frequency-domain symbol sequence, and processing each symbol in the frequency-domain symbol sequence by using an IFFT circuit, to obtain each time-domain symbol.

Optionally, an implementation of performing, by the WLAN baseband chip, the postprocessing on the n pieces of to-be-modulated data to obtain the FDMA PPDU includes but is not limited to the following two implementations:

In a first implementation, an implementation process of performing, by the WLAN baseband chip, the postprocessing on the n pieces of to-be-modulated data to obtain the FDMA PPDU includes the following step A1 to step G1.

In step A1, the WLAN baseband chip sequentially and respectively modulates bits in the n pieces of to-be-modulated data to the n subcarrier groups of the corresponding WLAN devices based on the subcarrier coefficient to obtain the frequency-domain symbol sequence.

The WLAN baseband chip responds to a fact that modulated data corresponding to each WLAN device is a SYNC sequence, and performs OOK modulation on a subcarrier coefficient set and a SYNC sequence that correspond to a target WLAN device, to modulate the SYNC sequence to a subcarrier group of the corresponding WLAN device, to obtain the frequency-domain symbol sequence. The target WLAN device is any one of the n WLAN devices.

Alternatively, the WLAN baseband chip responds to a fact that a SYNC sequence corresponding to a to-be-modulated data sequence is an HDR SYNC sequence, and performs OOK modulation on a subcarrier coefficient set and first modulation data that correspond to a target WLAN device, to modulate the first modulation data to a subcarrier group of the corresponding WLAN device, to obtain the frequency-domain symbol sequence, where the first modulation data includes a SYNC sequence and/or a data sequence.

Alternatively, the WLAN baseband chip responds to a fact that a to-be-modulated data sequence includes a data sequence whose corresponding SYNC sequence is an LDR SYNC sequence, and performs extension processing on the subcarrier coefficient to obtain an extended subcarrier coefficient, where the extended subcarrier coefficient includes a primary subcarrier coefficient and a secondary subcarrier coefficient, and the secondary subcarrier coefficient is determined based on the primary subcarrier coefficient. The WLAN baseband chip performs OOK modulation on an extended subcarrier coefficient set and first modulation data that correspond to a target WLAN device, to modulate the first modulation data to a subcarrier group of the corresponding WLAN device, to obtain the frequency-domain symbol sequence, where the first modulation data includes a SYNC sequence and/or a data sequence, and the target WLAN device is any WLAN device in the n WLAN devices.

It should be noted that when the WLAN baseband chip performs the OOK modulation on the SYNC sequence and the data sequence that corresponds to the HDR SYNC sequence, the WLAN baseband chip performs the OOK modulation on the SYNC sequence and the data sequence that correspond to the target WLAN device and the subcarrier coefficient set corresponding to the target WLAN device in the subcarrier coefficient, and it may be considered that one bit in the SYNC sequence and one bit in the data sequence are modulated to one element in one subcarrier coefficient set. When the WLAN baseband chip performs the OOK modulation on the data sequence corresponding to the LDR SYNC sequence, the data sequence includes a data sequence on which the duplicating processing has been performed, the data sequence on which the duplicating processing has been performed includes a plurality of continuous data groups, each data group includes b pieces of same data, and a value of b is a quantity of symbols included in the extended subcarrier coefficient. Because the extended subcarrier coefficient includes two symbols in total: a primary subcarrier coefficient and a secondary subcarrier coefficient, b=2. If the first modulation data is a data sequence, the WLAN baseband chip performs the OOK modulation on the data sequence corresponding to the target WLAN device and the extended subcarrier coefficient set corresponding to the target WLAN device, and it may be considered that the WLAN baseband chip modulates, to two elements in the subcarrier coefficient set, one bit in the data sequence on which the duplicating processing has been performed and that is included in the data sequence.

In step B1, the WLAN baseband chip processes each symbol in the frequency-domain symbol sequence by using the IFFT circuit, to obtain each time-domain symbol.

In step C1, the WLAN baseband chip intercepts a half of the time-domain symbol processed by the IFFT circuit, to obtain a short time-domain symbol. For example, intercepting the half of the time-domain symbol may be intercepting the first half of sampling point data included in the time-domain symbol.

In step D1, the WLAN baseband chip obtains a second amount of sampling point data in the short time-domain symbol, and adds the second amount of sampling point data to the short time-domain symbol, to obtain a time-domain symbol into which a GI has been inserted. The second amount of sampling point data is sampling point data in a tail part of the short time-domain symbol, and a value of the second amount is less than a value of a first amount.

In step E1, the WLAN baseband chip performs windowing processing on the time-domain symbol into which the GI has been inserted, to obtain a time-domain symbol on which the windowing processing has been performed.

In step F1, the WLAN baseband chip performs random processing on the time-domain symbol on which the windowing processing has been performed, to obtain a time-domain symbol on which the random processing has been performed. The random processing includes randomization processing and cyclic shift randomization processing.

In step G1, the WLAN baseband chip performs CSD processing on the time-domain symbol on which the random processing has been performed, and obtains the FDMA PPDU based on the time-domain symbol on which the CSD processing has been performed. A process of obtaining the FDMA PPDU based on the time-domain symbol on which the CSD processing has been performed may include: performing intermediate radio frequency processing on the time-domain symbol on which the CSD processing has been performed, to obtain the FDMA PPDU.

It should be noted that before step B1, or before step C1, or before step D1, the WLAN baseband chip may insert a guard subcarrier into to-be-processed data, to obtain data into which the subcarrier has been inserted. The to-be-processed data may be the frequency-domain symbol sequence, the time-domain symbol obtained processed by the IFFT circuit, the short time-domain symbol, or the like. For example, the WLAN baseband chip may insert guard subcarriers into two ends of the subcarrier coefficient sequence.

In a second implementation, an implementation process of performing, by the WLAN baseband chip, the postprocessing on the n pieces of to-be-modulated data to obtain the FDMA PPDU includes the following step a and step b.

In step a, the WLAN baseband chip performs random processing on second modulation data, to obtain modulation data on which the random processing has been performed. The random processing includes randomization processing and cyclic shift randomization processing, and the second modulation data includes a subcarrier coefficient or a data sequence.

In step b, the WLAN baseband chip performs OOK modulation on the modulation data on which the random processing has been performed and the subcarrier coefficient, to modulate the modulation data on which the random processing has been performed to a subcarrier group of a corresponding WLAN device, to obtain the frequency-domain symbol sequence.

Optionally, a process of performing, by the WLAN baseband chip, the OOK modulation on the modulation data on which the random processing has been performed and the subcarrier coefficient includes: performing the OOK modulation on a subcarrier coefficient set corresponding to the target WLAN device and a CSD value, to obtain the frequency-domain symbol sequence, where the target WLAN device is any WLAN device in the n WLAN devices, and the CSD value Y meets:

$$Y = s_i m_i \exp(j2\Pi k \Delta_{F,WUR}(-T_{CSD}{}^{n_{tx}} - T_{CSR,i})),$$

where $s_i$ is an $i^{th}$ data value in to-be-modulated data corresponding to the target WLAN device, $m_i$ is a data value that is obtained after the random processing and that corresponds to an $i^{th}$ data value in the modulation data on which the random processing has been performed, k is a subcarrier sequence number, $\Delta_{F,WUR}$ is a subcarrier spacing value, $T_{CSD}{}^{n_{tx}}$ is a CSD value of an $n_{tx}{}^{th}$ antenna in the target WLAN device, and $T_{CSR,i}$ is a CSR value that corresponds to the target WLAN device and that is of an $i^{th}$ data value in a data sequence on which the duplicating processing has been performed.

In this embodiment of this application, when the to-be-modulated data sequence includes a data sequence whose corresponding SYNC sequence is an LDR SYNC sequence, before step b, extension processing is performed on the subcarrier coefficient to obtain an extended subcarrier coefficient, where the extended subcarrier coefficient includes a primary subcarrier coefficient and a secondary subcarrier coefficient, and the secondary subcarrier coefficient is determined based on the primary subcarrier coefficient. Correspondingly, the WLAN baseband chip performs the OOK modulation on the modulation data on which the random processing has been performed and the extended subcarrier coefficient, to modulate the modulation data on which the random processing has been performed to the subcarrier group of the corresponding WLAN device, to obtain the frequency-domain symbol sequence.

Optionally, after step b, the WLAN baseband chip may further process each symbol in the frequency-domain symbol sequence by using the IFFT circuit, to obtain each time-domain symbol. The WLAN baseband chip intercepts a half of the received time-domain symbol on which the IFFT processing has been performed, to obtain a short time-domain symbol. For example, intercepting the half of the time-domain symbol may be: intercepting the first half of sampling point data included in the time-domain symbol. The WLAN baseband chip obtains a second amount of sampling point data in the short time-domain symbol, and adds the second amount of sampling point data to the short time-domain symbol, to obtain a time-domain symbol into which a GI has been inserted. The second amount of sampling point data is sampling point data in a tail part of the short time-domain symbol, and a value of the second amount is less than a value of a first amount. The WLAN baseband chip performs windowing processing on the time-domain symbol into which the GI has been performed, to obtain the FDMA PPDU. A process of obtaining the FDMA PPDU based on the time-domain symbol on which the windowing processing has been performed may include: performing intermediate radio frequency processing on the time-domain symbol on which the windowing processing has been performed, to obtain the FDMA PPDU.

It should be noted that the WLAN baseband chip may further insert a guard subcarrier into to-be-processed data. The to-be-processed data may be the frequency-domain symbol sequence, the time-domain symbol processed by the IFFT circuit, the short time-domain symbol, or the like. For example, the WLAN baseband chip may insert guard subcarriers into two ends of the subcarrier coefficient sequence.

It should be noted that the FDMA PPDU generation method provided in this embodiment of this application further includes: generating, by a WLAN device, an L-STF, an L-LTF, an L-SIG, a BPSK-mark 1, and a BPSK-mark 2. For the process of generating the L-STF, the L-LTF, the L-SIG, the BPSK-mark 1, and the BPSK-mark 2, refer to a corresponding generation process recorded in IEEE 802.11a/g/n/ac/ax standards. Details are not described in this embodiment of this application.

It should be noted that a chronological order of steps of the FDMA PPDU generation method provided in this embodiment of this application may be properly adjusted, and the steps may also be correspondingly added or deleted based on a status. Any variation readily figured out by a person skilled in the art within the technical scope disclosed in this application shall fall within the protection scope of this application, and details are not described herein again.

To sum up, in the FDMA PPDU generation method provided in this embodiment of this application, in the FDMA PPDU generation process, data of the plurality of WLAN devices is modulated to carriers before IFFT (namely, in frequency domain). Therefore, a WLAN chip is modified slightly, and costs of a WLAN baseband chip supporting sending of a WUR frame of an FDMA PPDU are reduced. Because a length of a time-domain symbol of an LDR data part is twice a length of a time-domain symbol of an HDR data part, direct modulation leads to a result that time-domain symbols having different lengths cannot be obtained through IFFT. Therefore, each bit in the LDR data part is modulated twice by using a short time-domain symbol as a reference. In this way, LDR data of two same short time-domain symbols forms one long time-domain symbol, to implement compatibility with two types of symbols.

An embodiment of this application provides a WLAN device. The WLAN device includes a WLAN baseband chip. For example, the WLAN baseband chip may be the WLAN baseband chip shown in FIG. 5, FIG. 6, and FIG. 7.

An embodiment of this application provides an FDMA PPDU. The FDMA PPDU includes a plurality of sub PPDUs, each sub PPDU has a different frequency range, each sub PPDU includes a SYNC sequence and a data sequence, and the data sequence includes a plurality of data symbols.

When a target sub PPDU in the plurality of sub PPDUs is configured to be in an LDR mode, every b adjacent data symbols in a data sequence carried in the target sub PPDU carry same data, and b is a positive integer.

For example, b may be 2, and every two adjacent data symbols in the data sequence in the target sub PPDU carry same data. A data sequence corresponding to a WLAN device 1 in FIG. 3 is used as an example. Two adjacent data symbols $S_{1,1}$ and $S_{1,1}$ are the same, two adjacent data symbols $S_{1,2}$ and $S_{1,2}$ are the same, and by analogy, two adjacent data symbols $S_{1,d-1}$ and $S_{1,d-1}$ are the same.

It should be noted that starting from the data sequence, the following cases may be further included: b and b+1 are the same, b+2 and b+3 are the same, and b+4 and b+5 are the same. This is not limited in this embodiment of this application.

Figure 9:
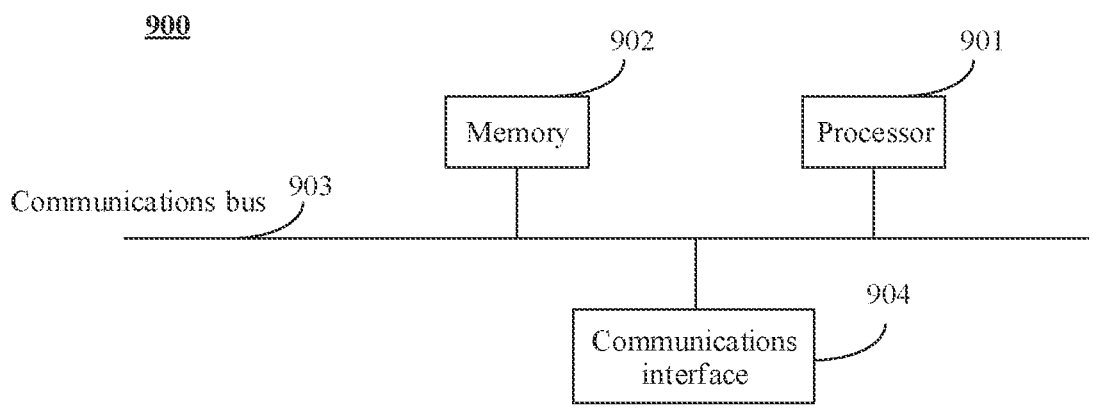
FIG. 9 is a block diagram of a WLAN device according to an embodiment of this application.

FIG. 9 is a block diagram of a WLAN device according to an embodiment of this application. As shown in FIG. 9, a WLAN device 900 includes a processor 901 and a memory 902.

The memory 902 is configured to store a computer program, where the computer program includes a program instruction.

The processor 901 is configured to invoke the computer program to implement the FDMA PPDU generation method provided in the foregoing method embodiment.

Optionally, the WLAN device 900 further includes a communications bus 903 and a communications interface 904.

The processor 901 includes one or more processing cores, and the processor 901 runs the computer program, to perform various function applications and data processing.

The memory 902 may be configured to store a computer program. Optionally, the memory may store an operating system and an application program unit required by at least one function. The operating system may be an operating system such as real time executive system (Real Time eXecutive, RTX), LINUX, UNIX, WINDOWS, or OS X.

There may be a plurality of communications interfaces 904, and the communications interface 904 is configured to communicate with another storage device or a WLAN device. For example, in this embodiment of this application, the communications interface 904 may be configured to send a generated FDMA PPDU to a WLAN device at a receive end. Optionally, the communications network may be a software defined network (software defined network, SDN), a virtual extensible local area network (VXLAN), or the like.

The memory 902 and the communications interface 904 are separately connected to the processor 901 by using the communications bus 903.

An embodiment of this application further provides a computer storage medium. The computer storage medium stores an instruction. When the instruction is executed by a processor, the FDMA PPDU generation method provided in the foregoing method embodiment is implemented.

A person of ordinary skill in the art may understand that all or some of the steps in the embodiments may be implemented by hardware or a program instructing related hardware. The program may be stored in a computer readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A wireless local area network (WLAN) baseband chip, wherein the WLAN baseband chip comprises a memory and an inverse fast Fourier transform (IFFT) circuit, and the WLAN baseband chip is configured to:
   obtain, based on a subcarrier coefficient sequence in the memory, a subcarrier coefficient corresponding to a subcarrier set, wherein the subcarrier set comprises n subcarrier groups, each subcarrier group comprises a plurality of continuous subcarriers, each subcarrier group is discontinuous from other subcarrier groups of the n subcarrier groups, all subcarriers in the subcarrier set are in one frequency band, n is an integer greater than or equal to 2, and the n subcarrier groups correspond to n WLAN devices respectively;
   obtain, based on SYNC sequences stored in the memory, n SYNC sequences of the n WLAN devices, wherein each SYNC sequence corresponds to one WLAN device, and the n SYNC sequences comprise m low data rate (LDR) SYNC sequences and n−m high data rate (HDR) SYNC sequences, and m is a positive integer less than or equal to n;

obtain n data streams corresponding to the n WLAN devices respectively, and perform duplicating processing on m data streams in the n data streams to obtain m data sequences on which the duplicating processing has been performed and n−m remaining data streams, wherein the duplicating processing performed on a data stream comprises: duplicating each bit of the data stream to obtain a respective duplicate bit, and inserting the respective duplicate bit next to each corresponding bit;

obtain m pieces of to-be-modulated data based on the m LDR SYNC sequences and the m data sequences on which the duplicating processing has been performed, and obtain n−m pieces of to-be-modulated data based on the n−m HDR SYNC sequences and the n−m remaining data streams, to obtain n pieces of to-be-modulated data respectively corresponding to the n WLAN devices; and perform postprocessing on the n pieces of to-be-modulated data to obtain a frequency division multiple access (FDMA) physical layer convergence procedure protocol data unit (PPDU), wherein the postprocessing comprises: sequentially and respectively modulating bits in the n pieces of to-be-modulated data to the respective n subcarrier groups of the n WLAN devices based on the subcarrier coefficient to obtain a frequency-domain symbol sequence, and processing each symbol in the frequency-domain symbol sequence using the IFFT circuit to obtain a corresponding time-domain symbol.

2. The WLAN baseband chip according to claim 1, wherein every two non-zero coefficients in the subcarrier coefficient sequence are spaced by at least one zero coefficient.

3. The WLAN baseband chip according to claim 2, wherein the subcarrier coefficient sequence comprises p subcarrier coefficients, p is an odd number, values of a $2j^{th}$ subcarrier coefficient and a center subcarrier coefficient are zero, a value of a $(2j+1)^{th}$ subcarrier coefficient other than the center subcarrier coefficient is a non-zero value, j<p, and both j and p are positive integers.

4. The WLAN baseband chip according to claim 2, wherein the postprocessing further comprises intercepting a half of a time domain symbol to obtain a short time-domain symbol.

5. The WLAN baseband chip according to claim 1, wherein the subcarrier coefficient comprises n subcarrier coefficient sets corresponding to the n WLAN devices; and the WLAN baseband chip is configured to perform on off keying (OOK) modulation, in response to a piece of to-be-modulated data corresponding to each WLAN device being a SYNC sequence, based on a subcarrier coefficient set and a first SYNC sequence of the n SYNC sequences that correspond to a target WLAN device, to modulate the first SYNC sequence to a subcarrier group corresponding to the target WLAN device, to obtain the frequency-domain symbol sequence, wherein the target WLAN device is one of the n WLAN devices; or the WLAN baseband chip is configured to perform OOK modulation, in response to a SYNC sequence of the n SYNC sequences corresponding to a piece of to-be-modulated data being an HDR SYNC sequence, based on a subcarrier coefficient set and first modulation data that correspond to a target WLAN device, to modulate the first modulation data to a subcarrier group corresponding to the target WLAN device, to obtain the frequency-domain symbol sequence, wherein the first modulated data comprises a SYNC sequence and/or a data sequence.

6. The WLAN baseband chip according to claim 1, wherein the subcarrier coefficient comprises n subcarrier coefficient sets corresponding to the n WLAN devices;

the WLAN baseband chip is configured to perform extension processing on the subcarrier coefficient to obtain an extended subcarrier coefficient, wherein the extended subcarrier coefficient comprises a primary subcarrier coefficient and a secondary subcarrier coefficient, and the secondary subcarrier coefficient is determined based on the primary subcarrier coefficient; and the WLAN baseband chip is configured to perform OOK modulation, in response to a piece of to-be-modulated data comprising a data sequence whose corresponding SYNC sequence is an LDR SYNC sequence, based on an extended subcarrier coefficient set and first modulation data that correspond to a target WLAN device, to modulate the first modulation data to a subcarrier group corresponding to the target WLAN device, to obtain the frequency-domain symbol sequence, the first modulation data comprises a SYNC sequence and/or a data sequence, and the target WLAN device is a WLAN device in the n WLAN devices.

7. The WLAN baseband chip according to claim 1, wherein the WLAN baseband chip is further configured to perform random processing on second modulation data, to obtain modulation data on which the random processing has been performed, the random processing comprises randomization processing and cyclic shift randomization processing, and the second modulation data comprises a SYNC sequence or a data sequence; and the WLAN baseband chip is configured to perform OOK modulation on the modulation data on which the random processing has been performed and the subcarrier coefficient, to modulate the modulation data on which the random processing has been performed to a subcarrier group corresponding to a target WLAN device, to obtain the frequency-domain symbol sequence.

8. The WLAN baseband chip according to claim 7, wherein the WLAN baseband chip is further configured to perform extension processing on the subcarrier coefficient, to obtain an extended subcarrier coefficient, the extended subcarrier coefficient comprises a primary subcarrier coefficient and a secondary subcarrier coefficient, and the secondary subcarrier coefficient is determined based on the primary subcarrier coefficient; and the WLAN baseband chip is configured to perform the OOK modulation on the modulation data on which the random processing has been performed and the extended subcarrier coefficient, to modulate the modulation data on which the random processing has been performed to the subcarrier group corresponding to the target WLAN device, to obtain the frequency-domain symbol sequence.

9. The WLAN baseband chip according to claim 7, wherein the WLAN baseband chip is configured to perform the OOK modulation on a subcarrier coefficient set corresponding to the target WLAN device and a cyclic shift diversity (CSD) value, to obtain the frequency-domain symbol sequence, the target WLAN device is a WLAN device in the n WLAN devices, and the CSD value Y meets:

$$Y=s_i m_i \exp(j2\pi k \Delta_{F,WUR}(-T_{CSD}^{n_{tx}}-T_{CSR,i})),$$

where $s_i$ is an $i^{th}$ data value in a piece of to-be-modulated data corresponding to the target WLAN device, $m_i$ is a data value that is obtained after the random processing is performed and that corresponds to an $i^{th}$ data value in the modulation data on which the random processing has been performed, k is a subcarrier sequence number, $\Delta_{F,WUR}$ is a subcarrier spacing value, $T_{CSD}{}^{n_{tx}}$ is a CSD value of an $n_{tx}{}^{th}$ antenna in the target WLAN device, and $T_{CSR,i}$ is a CSR value that corresponds to the target WLAN device and that is of an $i^{th}$ data value in a data sequence on which the duplicating processing has been performed.

10. A wireless local area network (WLAN) device, wherein the WLAN device comprises the WLAN baseband chip according to claim 1.

11. The WLAN device according to claim 10, wherein every two non-zero coefficients in the subcarrier coefficient sequence are spaced by at least one zero coefficient.

12. The WLAN device according to claim 11, wherein the subcarrier coefficient sequence comprises p subcarrier coefficients, p is an odd number, values of a $2j^{th}$ subcarrier coefficient and a center subcarrier coefficient are zero, a value of a $(2j+1)^{th}$ subcarrier coefficient other than the center subcarrier coefficient is a non-zero value, j<p, and both j and p are positive integers.

13. The WLAN device according to claim 11, wherein the postprocessing further comprises intercepting a half of a time domain symbol to obtain a short time-domain symbol.

14. The WLAN device according to claim 10, wherein the subcarrier coefficient comprises n subcarrier coefficient sets corresponding to the n WLAN devices; and
  the WLAN baseband chip is configured to perform on off keying (OOK) modulation, in response to a piece of to-be-modulated data corresponding to each WLAN device being a SYNC sequence, based on a subcarrier coefficient set and a first SYNC sequence of the n SYNC sequences that correspond to a target WLAN device, to modulate the first SYNC sequence to a subcarrier group corresponding to the target WLAN device, to obtain the frequency-domain symbol sequence, wherein the target WLAN device is one of the n WLAN devices; or
  the WLAN baseband chip is configured to perform OOK modulation, in response to a SYNC sequence of the n SYNC sequences corresponding to a piece of to-be-modulated data being an HDR SYNC sequence, based on a subcarrier coefficient set and first modulation data that correspond to a target WLAN device, to modulate the first modulation data to a subcarrier group corresponding to the target WLAN device, to obtain the frequency-domain symbol sequence, wherein the first modulated data comprises a SYNC sequence and/or a data sequence.

15. The WLAN baseband chip according to claim 10, wherein the subcarrier coefficient comprises n subcarrier coefficient sets corresponding to the n WLAN devices;
  the WLAN baseband chip is configured to perform extension processing on the subcarrier coefficient to obtain an extended subcarrier coefficient, wherein the extended subcarrier coefficient comprises a primary subcarrier coefficient and a secondary subcarrier coefficient, and the secondary subcarrier coefficient is determined based on the primary subcarrier coefficient; and
  the WLAN baseband chip is configured to perform OOK modulation, in response to a piece of to-be-modulated data comprising a data sequence whose corresponding SYNC sequence is an LDR SYNC sequence, based on an extended subcarrier coefficient set and first modulation data that correspond to a target WLAN device, to modulate the first modulation data to a subcarrier group corresponding to the target WLAN device, to obtain the frequency-domain symbol sequence, the first modulation data comprises a SYNC sequence and/or a data sequence, and the target WLAN device is a WLAN device in the n WLAN devices.

16. The WLAN baseband chip according to claim 10, wherein the WLAN baseband chip is further configured to perform random processing on second modulation data, to obtain modulation data on which the random processing has been performed, the random processing comprises randomization processing and cyclic shift randomization processing, and the second modulation data comprises a SYNC sequence or a data sequence; and
  the WLAN baseband chip is configured to perform OOK modulation on the modulation data on which the random processing has been performed and the subcarrier coefficient, to modulate the modulation data on which the random processing has been performed to a subcarrier group corresponding to a target WLAN device, to obtain the frequency-domain symbol sequence.

17. A method comprising:
  obtaining, based on a subcarrier coefficient sequence, a subcarrier coefficient corresponding to a subcarrier set, wherein the subcarrier set comprises n subcarrier groups, each subcarrier group comprises a plurality of continuous subcarriers, each subcarrier group is discontinuous from other subcarrier groups of the n subcarrier groups, all subcarriers in the subcarrier set are in one frequency band, n is an integer greater than or equal to 2, and the n subcarrier groups correspond to n WLAN devices respectively;
  obtaining n SYNC sequences of the n WLAN devices based on SYNC sequences, wherein each SYNC sequence corresponds to one WLAN device, the n SYNC sequences comprise m low data rate LDR SYNC sequences and n−m high data rate HDR SYNC sequences, and m is a positive integer less than or equal to n;
  obtaining n data streams corresponding to the n WLAN devices respectively, and performing duplicating processing on m data streams in the n data streams, to obtain m data sequences on which the duplicating processing has been performed and n−m remaining data streams, wherein the duplicating processing performed on a data stream comprises: duplicating each bit in the data stream performed to obtain a respective duplicate bit, and inserting the respective duplicate bit next to each corresponding bit;
  obtaining m pieces of to-be-modulated data based on the m LDR SYNC sequences and the m data sequences on which the duplicating processing has been performed, and obtain n−m pieces of to-be-modulated data based on the n−m HDR SYNC sequences and the n−m remaining data streams, to obtain n pieces of to-be-modulated data respectively corresponding to the n WLAN devices; and
  performing postprocessing on the n pieces of to-be-modulated data to obtain a frequency division multiple access FDMA PPDU, wherein the postprocessing comprises: sequentially and respectively modulating bits in the n pieces of to-be-modulated data to the n subcarrier groups of the n WLAN devices based on the subcarrier coefficient to obtain a frequency-domain symbol sequence, and processing each symbol in the frequency-domain symbol sequence to obtain a corresponding time-domain symbol.

18. The method according to claim 17, wherein every two non-zero coefficients in the subcarrier coefficient sequence are spaced by at least one zero coefficient.

19. The method according to claim 18, wherein the subcarrier coefficient sequence comprises p subcarrier coefficients, p is an odd number, values of a $2j^{th}$ subcarrier coefficient and a center subcarrier coefficient are zero, a value of a $(2j+1)^{th}$ subcarrier coefficient other than the center subcarrier coefficient is a non-zero value, j<p, and both j and p are positive integers.

20. The method according to claim 18, wherein the postprocessing further comprises:
intercepting a half of a time-domain symbol to obtain a short time-domain symbol.

* * * * *